United States Patent [19]
Mori et al.

[11] Patent Number: 5,854,581
[45] Date of Patent: Dec. 29, 1998

[54] TRANSACTION PROCESSING SYSTEM AND TRANSACTION PROCESSING METHOD

[75] Inventors: Tohru Mori; Seiji Yoshizawa; Yoshinori Koshida; Shusaku Tanabe; Sinichi Suto; Satoshi Hamasaki, all of Tokyo, Japan

[73] Assignee: Oki Electric Industry Co., Ltd., Tokyo, Japan

[21] Appl. No.: 704,782

[22] PCT Filed: Mar. 7, 1995

[86] PCT No.: PCT/JP95/00369

§ 371 Date: Sep. 6, 1996

§ 102(e) Date: Sep. 6, 1996

[87] PCT Pub. No.: WO95/24690

PCT Pub. Date: Sep. 14, 1995

[30] Foreign Application Priority Data

Mar. 8, 1994 [JP] Japan ..................................... 6-036813

[51] Int. Cl.⁶ ..................................................... G06F 17/60
[52] U.S. Cl. ........................................... 235/379; 235/380
[58] Field of Search ..................................... 235/379, 380

[56] References Cited

U.S. PATENT DOCUMENTS 4,752,677 6/1988 Kakono et al. ......................... 235/380
4,877,947 10/1989 Mori .

FOREIGN PATENT DOCUMENTS

| 53-134342 | 11/1978 | Japan . |
| 2-1049 | 1/1990 | Japan . |
| 2-57396 | 2/1990 | Japan . |
| 3-92966 | 4/1991 | Japan . |
| 4-77995 | 3/1992 | Japan . |
| 4-227567 | 8/1992 | Japan . |
| 5-266053 | 10/1993 | Japan . |
| WO91/16691 | 10/1991 | WIPO . |

*Primary Examiner*—Harold Pitts
*Attorney, Agent, or Firm*—Wenderoth, Lind & Ponack, L.L.P.

[57] ABSTRACT

This invention relates to a transaction processing system including a host computer (1), a transaction device (2), a first customer card (3) and a second customer card (4). The first card (3) and the second card (4) directly transfer information representing monetary values between them on the basis of signals verifying a transaction processing received from the host computer (1) through the transaction device (2). When the information representing the monetary values are exchanged between the first card (3) and the second card (4), the host computer (1) updates the balance of the account stored in the host computer (1).

29 Claims, 10 Drawing Sheets

TRANSACTION PROCESSING SYSTEM AND TRANSACTION PROCESSING METHOD

TECHNICAL FIELD

The present invention relates to a transaction processing system where funds are transferred through an electronic message between a host computer and an IC (integrated circuit) card via the IC card which accesses to the applicable account controlled by the host computer.

BACKGROUND TECHNOLOGY

Up to now, there have been transaction processing systems where the transaction processing is carried out by using IC cards where the following item is stored, i.e., information showing monetary values (hereafter referred to as "Electronic Money"), etc. The following describes a case when customers transact and process their accounts controlled, by for example, financial institutions by such a transaction processing system.

Electronic money, an IC card issuer's number, an IC card number, an account number of the IC card holder (hereafter referred to as "Customer"), and information such as a password of the customer, and a program for operating the transaction processing by using the IC card, are stored in the IC card used in the transaction processing system. The customer puts his (her) IC card into an automated teller machine (hereafter referred to as "ATM") of financial institutions, and accesses to the host computer connected on-line with the ATM. The host computer specifies the account number on the basis of information from the IC card, and inputs or outputs electronic money equivalent to an amount of money transacted between the account number and the IC card through the ATM. The transaction processing is carried out by doing so in the transaction processing system.

However, such transaction processing systems did not succeed easily, because they possess the following problems.

The first problem was that it was very difficult to keep a secret on a mechanism where the transaction machine generates electronic money and writes its amount in the IC card. The transaction machine is a product manufactured by many manufacturers related to each other. For this reason, these manufacturers were likely to know this secret. As described above, the transaction machine can generate electronic money and can write its amount in the IC card, and is a general-purpose product which a third party can operate. For this reason, the third party was likely to disassemble the transaction processing system and to analyze its mechanism for the purpose of falsifying the information stored in IC cards. Accordingly, it was impossible to ensure the security of the transaction machine at the same high level as that of the host computer. Because of these reasons, it was necessary for IC card issuers to strictly carry out credit investigation on customers, and it was difficult to simplify the business. Also, customers rejected as a result of the credit investigation, did not use any transaction machines using IC cards such as POS (point of sales) system, vending machines, etc., of retail stores, because they cannot hold any IC cards.

The second problem was that the transaction processing of the IC cards complicated the settlement of accounts in financial institutions. That is, the transaction processing increases the number of procedures for checking the amount of funds transferred by receiving and paying money through electronic money as well as through cash at each branch of the financial institutions. The amount of such funds through electronic money is controlled by complex processes, and there was little room for decreasing the number of these complex processes by means of ideas of only financial institutions. Therefore, it was difficult for these financial institutions to simplify their businesses.

The third problem was that direct transaction processing between IC cards and the host computer would impose a very heavy burden on the host computer. For this reason, only a small number of cases were transacted and processed even by using a host computer with high processing capability.

SUMMARY OF THE INVENTION

A transaction processing system comprising a host computer, a transaction machine, a first card for customers, and a second card; wherein the transaction machine includes an interface for transmitting and receiving signals between the transaction machine and the host computer, a first card reader-writer for transmitting and receiving signals between the first card reader-writer and the first card, and a second card reader-writer for transmitting and receiving signals between the second card reader-writer and the second card; the first card includes a memory for storing therein account information, information necessary for a transaction processing, information representing monetary values, and a CPU for executing the transaction processing; the second card includes a memory for storing information necessary for the transaction processing and a CPU for executing the transaction processing; wherein the first card and the second card directly and mutually transfer the information representing monetary values based on a signal representing authentication of the transaction processing which is received from the host computer by way of the transaction machine; and wherein the host computer renews a sum of an applicable account stored in the host computer which is increased or decreased by transacting and processing the applicable account when the information representing monetary values is transferred between the first card and the second card.

As a result, the transaction processing system and transaction processing method according to the present invention obtain the following effects.

The feature of the above system and method is that the transaction processing is executed by transferring electronic money. Therefore, the transaction machine is not designed to generate any electronic money, and is not related to any transaction processing by electronic money transferred between the first and the second cards. That is, the transaction machine is not designed to control the transaction processing, and the first or the second card is designed to do so. Accordingly, the transaction processing is carried out by directly transferring electronic money between the first and the second cards. In addition, the two cards can be manufactured as respective products by a manufacturer, system programs can be set by card suppliers, and original user programs can be set by financial institutions, etc. Therefore, only limited persons can know about the mechanism for transferring electronic money. As a result, it is possible to ensure extremely high security in the same way as that of the host computer, nevertheless the transaction processing system and the transaction processing method described in the present invention are general-purposed.

Also, the feature of the above system and method is that the amount of money is newly increased or decreased by transacting and processing the account stored in the host computer through the transfer of information which shows monetary values between the first and the second cards. Therefore, the above system and method means that the transaction processing actually transfers assets owned by card issuers or financial institutions which are their cooperators. Accordingly, in the transaction processing system and the transaction processing of the present invention, the assets owned by the card holder or the financial institutions as the cooperators, are actually transferred. That is, the settlement of accounts is completed immediately in financial institutions. Also, financial institutions can simply carry out the accounting because they can check the amount of money transferred through electronic money by checking the second card. As a result, the above system and method allow financial institutions to save labor on accounting.

In addition, the feature of the above system and method is that the host computer only authenticates the transaction processing between the first and the second cards at the transfer of electronic money. Accordingly, it is possible to allot to the second card the processing carried out only by the host computer, for example, charging of electronic money to the first card, checking of errors before and after transaction processing, etc. Therefore, a burden of the host computer is lightened. As a result, the above system and method allow the host computer to carry out a large quantity of transaction processing.

Figure 1:
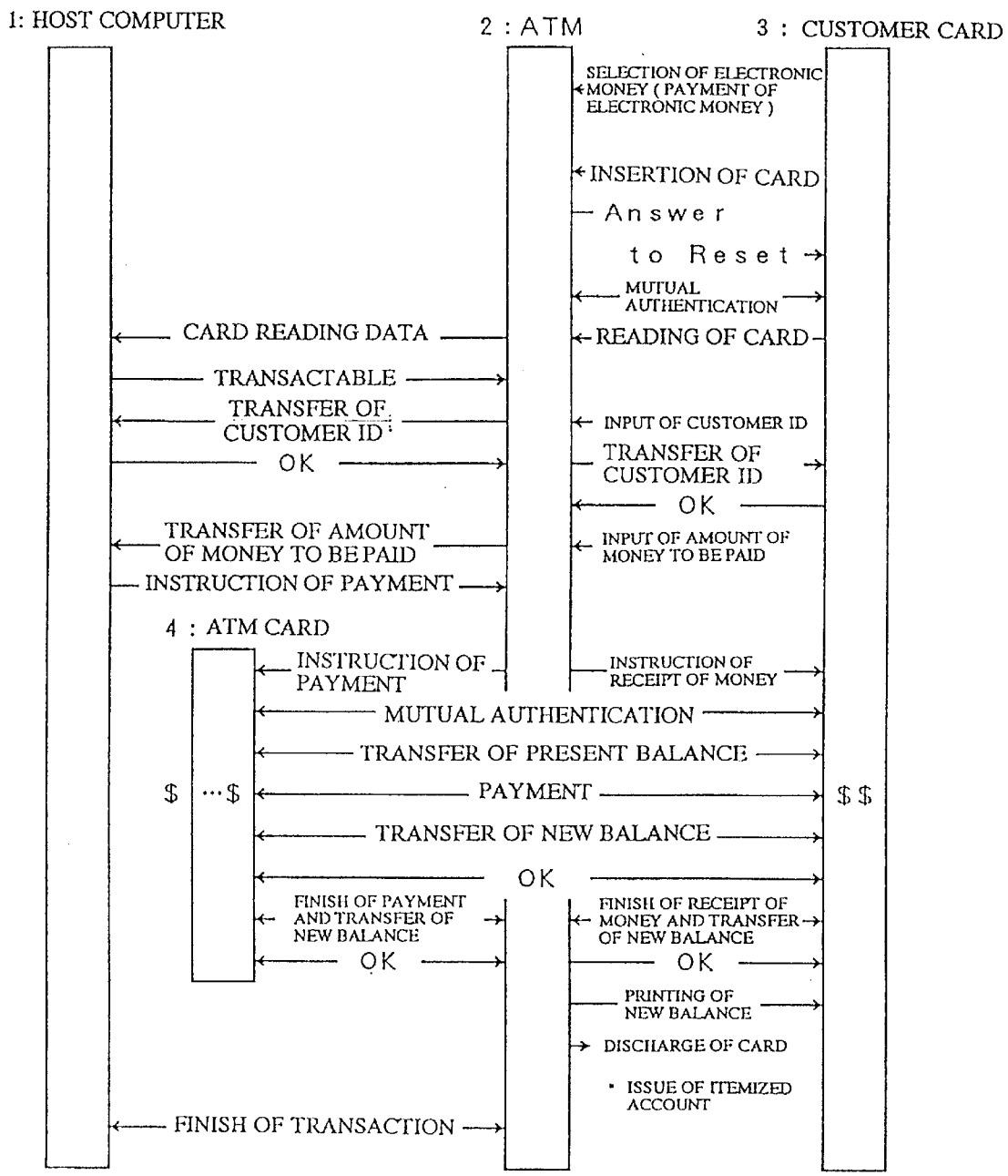
FIG. 1 shows procedures for transaction processing according to the first embodiment of the present invention.

DETAILED DESCRIPTION OF THE PREFERRED EMBODIMENTS (Summary of Transaction Processing System)

The present invention relates to a transaction processing method and a transaction processing system where access is made from the transaction machine to the host computer of financial institutions, etc., by using a first card (hereafter called, "Customer's Card") for customers issued by card issuers of these financial institutions, etc., and the accounts controlled by host computer are subjected to the transaction processing such as deposit, withdrawal (may be payment, hereafter called, "Payment"), transfer, borrowing, etc.

The transaction processing system of the present invention is composed mainly of a host computer owned and controlled by card issuers or their cooperators, a transaction machine owned and controlled by card issuers or their cooperators, a second card owned and controlled by card issuers or their cooperators and customer's cards owned and controlled by card holders. The host computer and the transaction machine are connected on-line with each other. The transaction machine and customer's cards are connected with each other at the card reader-writer for customer's cards set in the transaction machine. Also, the transaction machine and the second card are connected with each other at the card reader-writer for the second card set in the transaction machine. In the transaction processing system having such an arrangement, the customer's card and the second card receive signals (for authenticating the transaction processing) transmitted from the host computer by way of the transaction machine, and mutually transfer information (hereafter called, "Electronic Money") which directly shows monetary values on the basis of these signals. The host computer renews the amount of money increased or decreased by transacting and processing the account stored in the host computer through the transfer of electronic money between the customer's card and the second card. Also, the state where the customer's card and the second card directly transfer electronic money to each other means that the transaction machine relays signals received and transmitted between the customer's card and the second card without interposition in the transaction processing. That is, the state means that the transaction machine does not control the transaction processing, but the first or the second card controls it.

Also, it is considered that the above transaction machine is used in various fields. For example, it is possible to apply such transaction machines to the ATM and safes set in financial institutions, the POS terminal, vending machines, and ticket machines set in shops, etc., and the computer, videotex, telephone, etc., set in households and offices.

It is also considered that the customer's card and second card are applied to products in various shapes other than the shape of cards, if these products are equipped with an IC. For example, such a card can be incorporated as a component in a certain machine, or can be used in the share of only an IC chip.

(Generation of Electronic Money)

The transaction processing system of the present invention is designed so that only limited persons can know the mechanism of the generation of electronic money in order to ensure the security of the electronic money at a high level. For this reason, this mechanism is not incorporated in any general-purpose products which can be operated by a third party. That is, the mechanism is incorporated only in controlled strictly products.

The following is an explanation of products equipped with the above mechanism.

Products equipped with such a mechanism are used under strict control of a person having powers to issue bank bills or the keyman of the management of each financial institution. The person having powers to do so means the central bank (the Bank of Japan in the case of Japan), and the keyman means the head office or the like of city banks. For example, when the central bank uses such products, the central bank will make a loan of electronic money as a currency to city banks instead of bank bills and securities which the central bank has lent to these city banks up to now. In this case, the currency must be equivalent to these bank bills and securities. Also, when the head office or the like of city banks uses such products, the head office will generate a part (as electric money) of circulating capital in the whole capital held by these city banks, and instead, will freeze the capital equivalent to the electronic money as a fixed capital. With regard to the transfer of electronic money between the central bank and city banks and among head offices of respective city banks, for example, the electronic money is stored in the second card shown in the first embodiment (described later on) of the present invention, and this card is carried, or the transfer is carried out on-line.

(Arrangement of Transaction Processing System)

Figure 2:
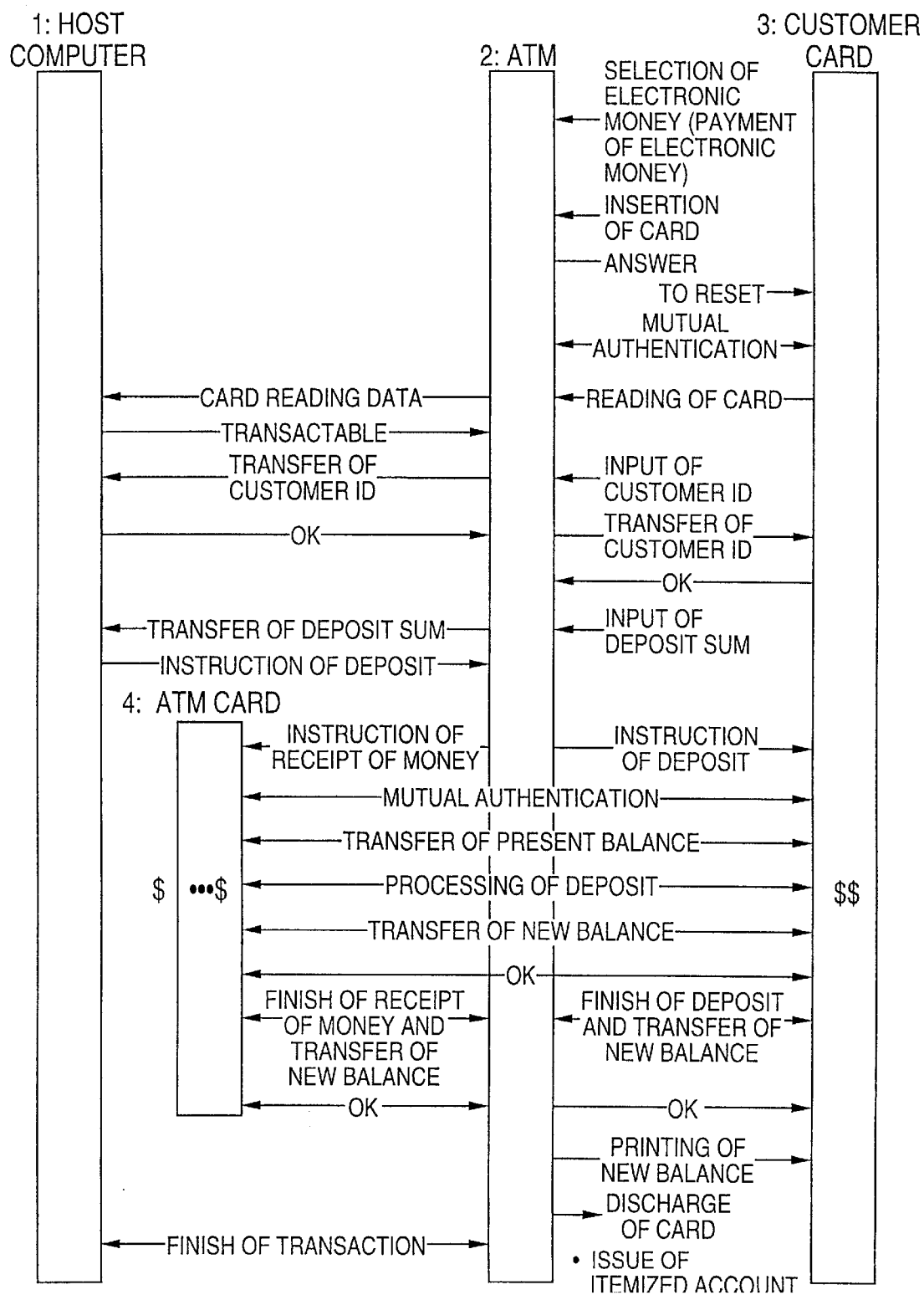
FIG. 2 shows procedures for transaction processing according to the first embodiment of the present invention.
Figure 3:
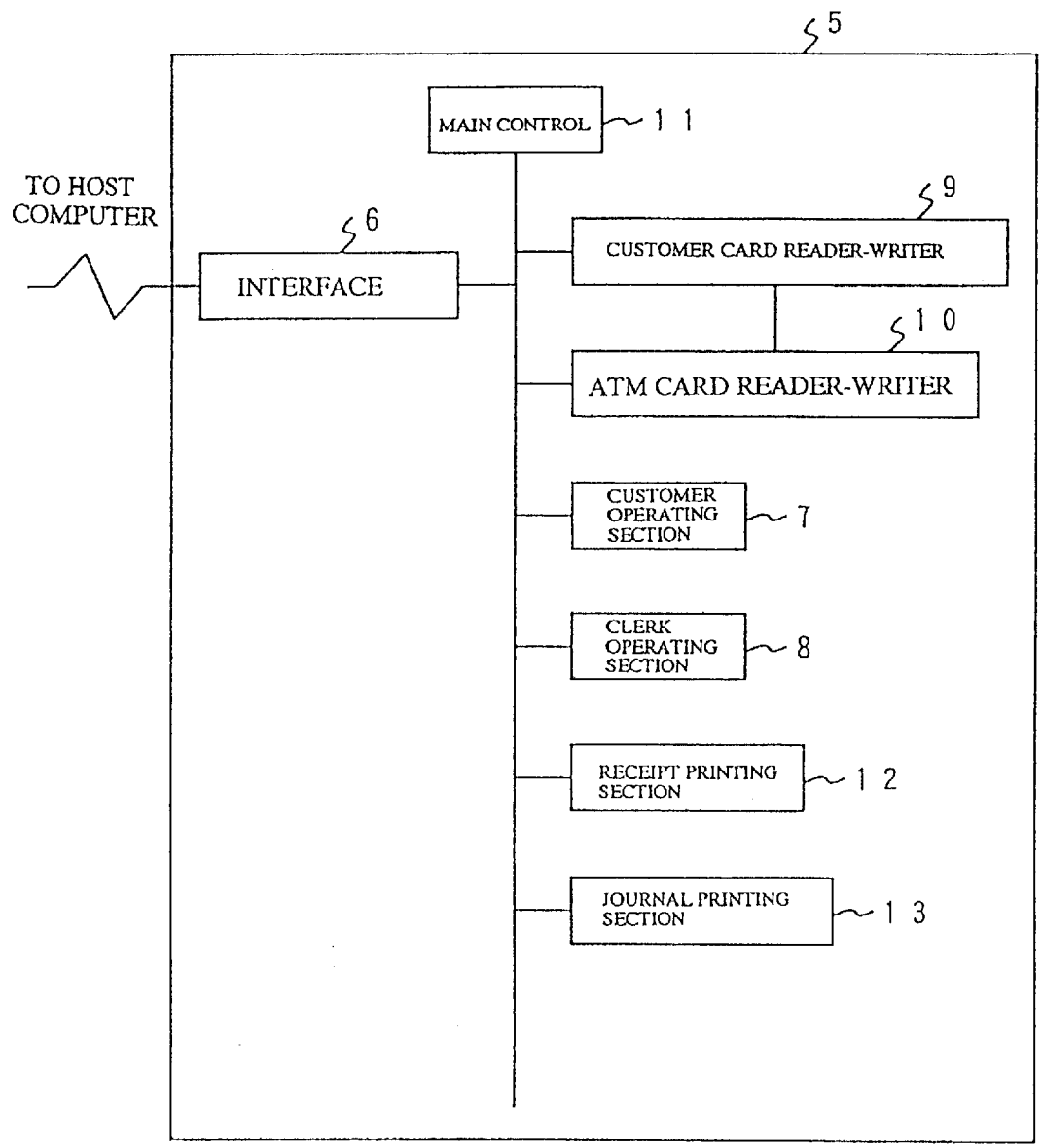
FIG. 3 is a block diagram of the inside of the transaction machine of the present invention.
Figure 4:
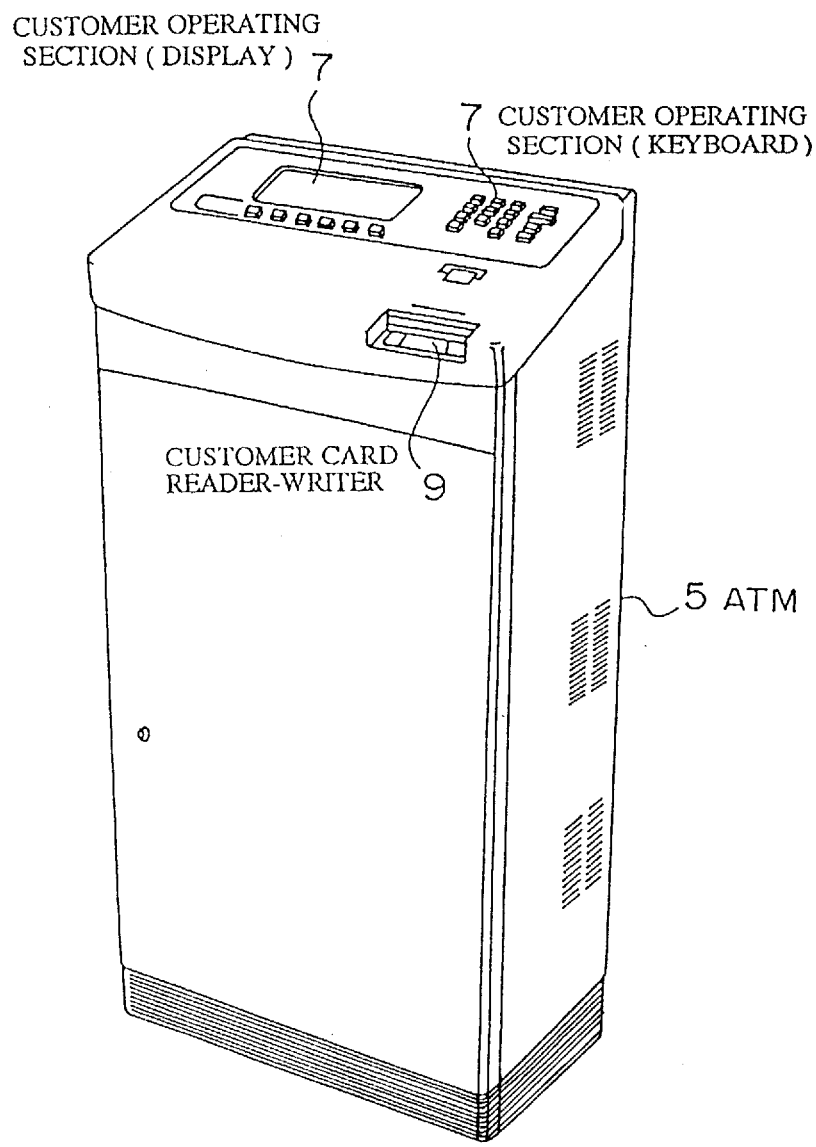
FIG. 4 is a view showing an external appearance of the transaction machine of the present invention.
Figure 5:
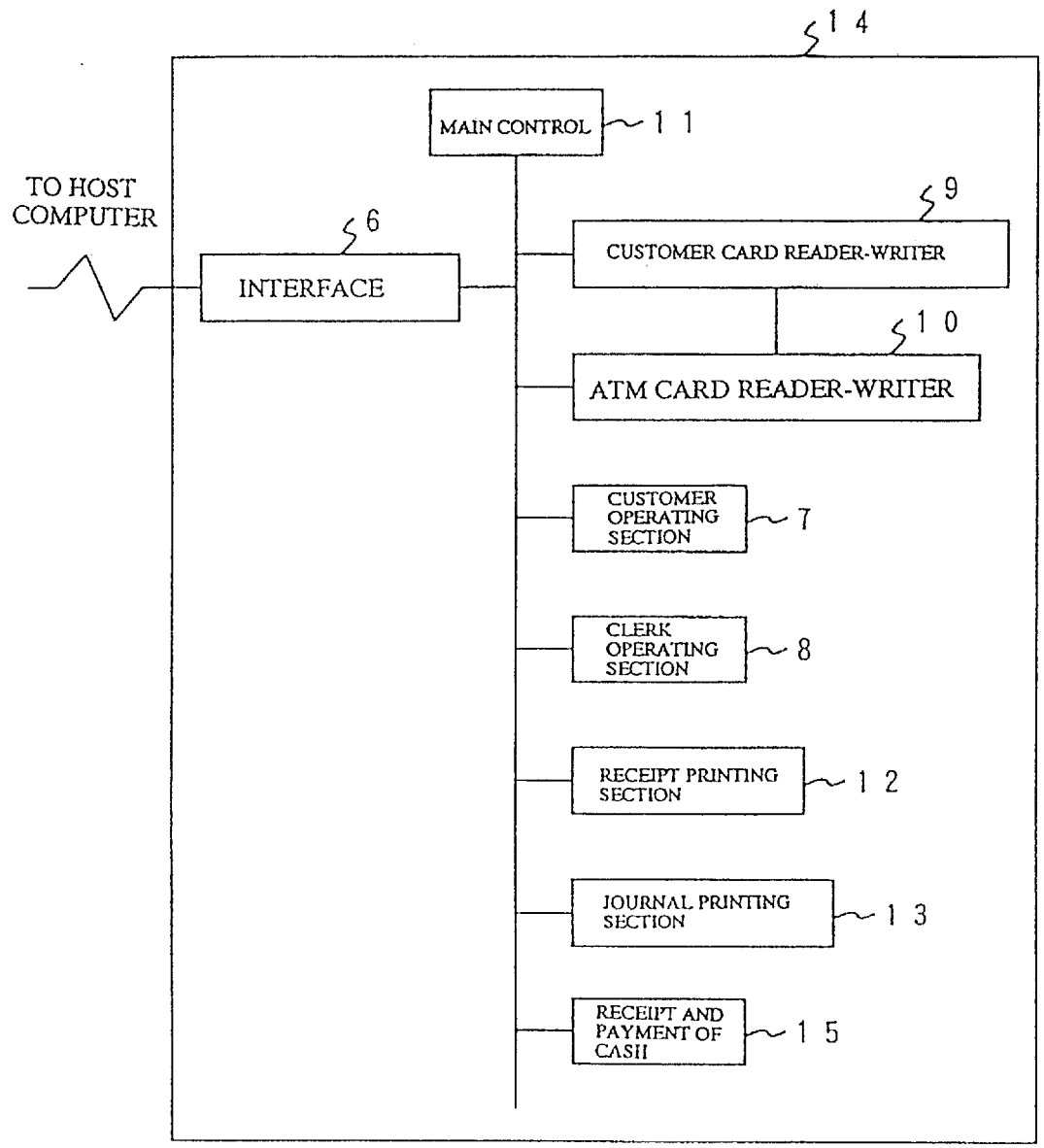
FIG. 5 is a block diagram of the inside of the transaction machine of the present invention.
Figure 6:
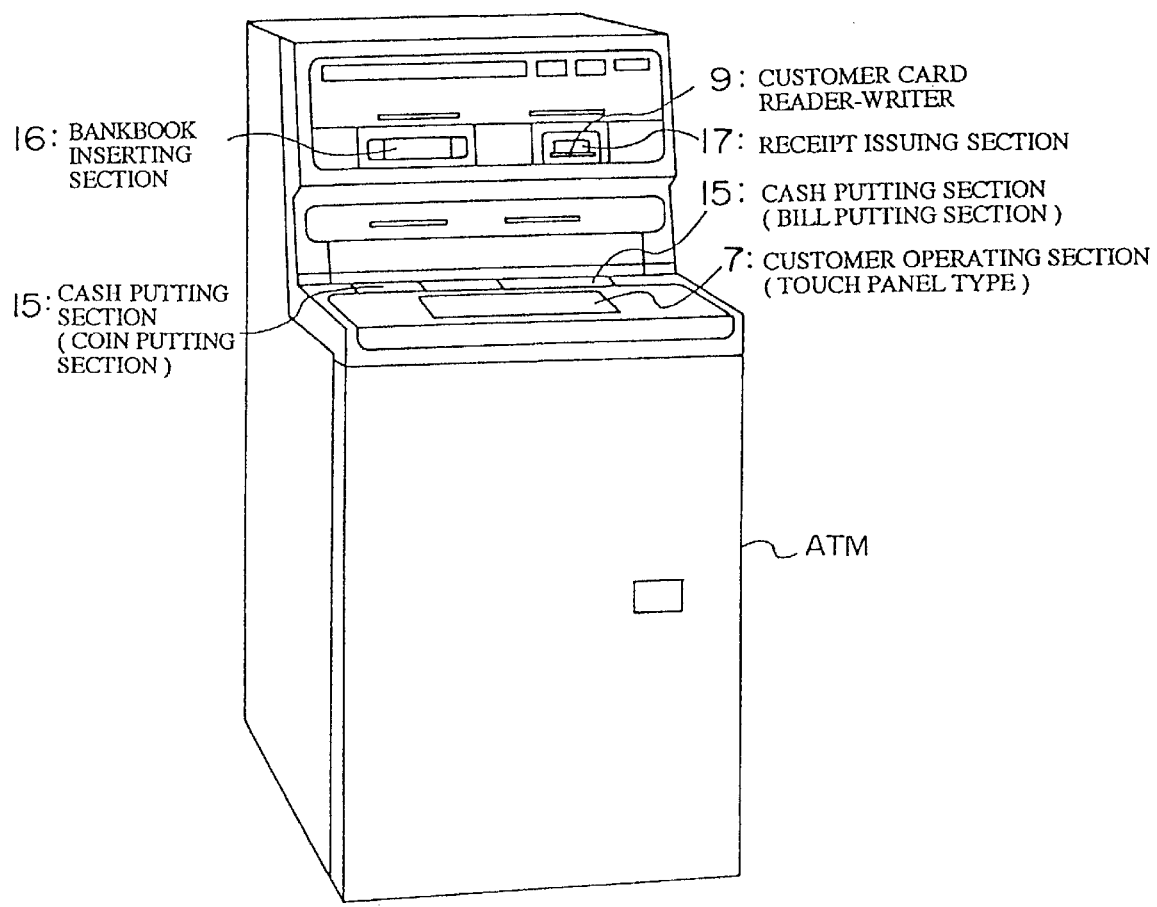
FIG. 6 is a view showing an external appearance of the transaction machine of the present invention.

As shown below, the transaction processing system is explained as an example of the present invention by using an ATM set in financial institutions. The ATM is a mode of the transaction machine in the present invention. FIGS. 1 and 2 show the first embodiment of procedures for transacting and processing the electronic money by way of ATM. FIG. 1 shows an example of withdrawal (may be payment, hereafter called, "Payment"), and FIG. 2 shows an example of deposit. The ATM is available in two types, one is designed to deal with only electronic money, and the other is designed to deal with both cash and electronic money. FIG. 3 shows the internal block of ATM designed to deal with only electronic money, and FIG. 4 shows the outside drawing of the ATM. Also, FIG. 5 shows the internal block of ATM designed to deal with both cash and electronic money, and FIG. 6 shows the outside drawing of the ATM. Also, both ATMs are explained by attaching an identical mark to their components having the same function as that of each other.

In FIGS. 1 and 2, denoted by 1 is a host computer, 2 is an ATM, 3 is a customer's card, and 4 is a second card (hereafter called, "ATM card"). respectively.

The host computer controls the account of customers. It is connected on-line with ATM 2. Customers input the following items from ATM 2 to the host computer, namely, information (including information on financial institution codes, a head office code, branch codes, account numbers, etc.,) on customer's card 3, and information (including information on customer' ID, information on contents of transaction processing, for example, deposit, payment, transferring, borrowing, etc., and information on amount of money transacted, etc.,). Therefore, the customers can carry out the transaction processing by accessing their accounts or the account at a bank to which they transfer money.

ATM 2 is a terminal where the transaction processing is executed by accessing the customer's accounts controlled by the host computer 1 or to the accounts at banks to which customers transfer money. This ATM 2 has an interface so that it can be connected on-line with the host computer 1, and has a reader-writer so that it can be connected with the customer's card 3 and the ATM card 4. Such an arrangement enables the host computer 1, customer's card 3, and ATM card 4 to input and output various information among them by way of the ATM 2.

The customer's card 3 is a product equipped with an IC issued from card issuers to customers. The following items are stored in this customer's card 3, namely, information necessary for transaction (including information on the financial institution codes, a head office code, branch codes, account numbers, code keys, etc.,), and electronic money and various programs (including a program for checking the genuineness of connected machines, a program for mutually authenticating an IC card and that of others, a program for coding or decoding information, and a program for stipulating communications, and a program for preventing illegal use, etc.,). These information and programs can be inputted or outputted in accordance with conditions determined in advance.

ATM card 4 is a product equipped with an IC owned and controlled by card issuers or financial institutions which are their cooperators. The following items are stored in this ATM card 4, namely, information necessary for transaction (including information on system codes, financial institution codes, card numbers, code keys, etc.,), and electronic money and various programs (including a program for checking genuineness of connected machines, a program for mutually authenticating IC card and that of others, a program for coding or decoding information, a program for stipulating communications, and a program for preventing illegal use, etc.,). These information and programs can be inputted or outputted in accordance with conditions determined in advance. The ATM card 4 is operated by a system program determined by a manufacturer who is a card supplier and by an original user's program determined by a financial institution which is a card issuer. From now on, both card issuer and card activator are unified, because they are identical in most cases.

Various measures against forgery or falsification of cards are taken for the above customer's card 3 and the ATM card 4 to ensure the security. Some of the examples of the measures are as follows, namely, checking of genuineness of connected machines, mutual authentication of an IC card and that of others, checking of customer's ID (including system code, card number, etc.,), execution of coding or decoding of information, locking of a part of a program, and volatilization of a part of a program, etc.

(Arrangement of Transaction Machine)

In FIGS. 3 and 4, denoted by 5 is an ATM designed to deal with only electronic money, 6 is an interface, 7 is a customer operating part, 8 is a clerk operating part in charge, 9 is a reader-writer of IC cards for customers (hereafter called, "Customer's Card Reader-Writer"), 10 is a reader-writer of ATM cards (hereafter called, "ATM Card Reader-Writer"), 11 is a main CPU, 12 is a receipt printer, and 13 is a journal printer.

In FIGS. 5 and 6, denoted by 14 is an ATM designed to deal with both cash and electronic money, 15 is a cash receipt and payment section, 16 is a bankbooks section, and 17 is a receipt issuance part.

The interface 6 is a section which communicates with the host computer 1 connected on-line with the ATM 2.

The customer operating part 7 is a section in which customers who are card holders input indications of transaction processing. The customer operating part 7 has an input (see the keyboard shown in FIG. 4, and the touch panel type customer operating indication shown in FIG. 6) where customers input instructions of transaction processing, customer ID, the amount of money transacted by these customers, etc., and has an indication part (see the display shown in FIG. 4, and the touch panel type customer operating indication shown in FIG. 6) which indicates the contents to these customers in accordance with the situation while renewing the contents.

The clerk operating part 8 is a section in which clerks of the financial institution input instructions such as starting, accounting, etc., of ATM 2. Usually, the clerk operating part 8 is established at the inside or backside of the door located in front of the machine so that customers cannot deal with the clerk operating part 8. It is also possible to design clerk part 8 in common with the input and the indication of the customer operating part 7.

The customer's card reader-writer 9 is connected with the customer's card 3 and reads or writes the electronic money and information necessary for transaction stored in customer's card 3.

The ATM card reader-writer 10 is connected with the ATM card 4 and reads or writes the electronic money and information necessary for transaction stored in ATM card 4.

The main control 11 is a section equipped with a program where electronic money can be transferred directly between customer's card 3 and ATM card 4. This program is processed prior to the transfer of electronic money, and includes in detail, a program for checking the genuineness of the customer's card 3 and that of ATM card 4, a program for discriminating between the dealing of cash and that of the electronic money, and a program for transmitting and receiving signals among host computer 1, the ATM 2, the customer's card 3, and the ATM card 4. Besides these programs, the main control stores therein a program for indicating the customer operating part 7, and a program for printing the issuing 17 of receipts. On the basis of these programs, ATM 2 checks the genuineness of IC card 3 for customers, accessing the account controlled by the host computer 1, and transfers the following items to the host computer 1, namely, information on customer's IDs inputted by customers, and the amount of money transacted and processed by these customers. In addition, ATM 2 transfers signals, which are for authenticating the transaction processing outputted by host computer 1, to the IC card 3 for customers and IC card 4 for the transaction machine.

The receipt printer 12 prints a result of the transaction processing on a receipt every transaction processing so that customers can visually check the result of the transaction processing.

The journal printer 13 prints the transaction processing history on receipts so that financial institutions can store this history or also stores the history in storage media such as a floppy disk, etc.

The cash receipt and payment section 15 is a part to which cash is put and from which cash is discharged. It has a bill dealing section and a coin dealing section (see FIG. 4).

The bankbooks section 16 reads and writes magnetic stripes for the bankbook of customers. It is also a block which prints particulars of transactions.

The receipt issuance part 17 discharges receipts printed by the receipt printer 12 to the outside.

(Arrangement of Customer's Card and ATM Card)

Figure 7:
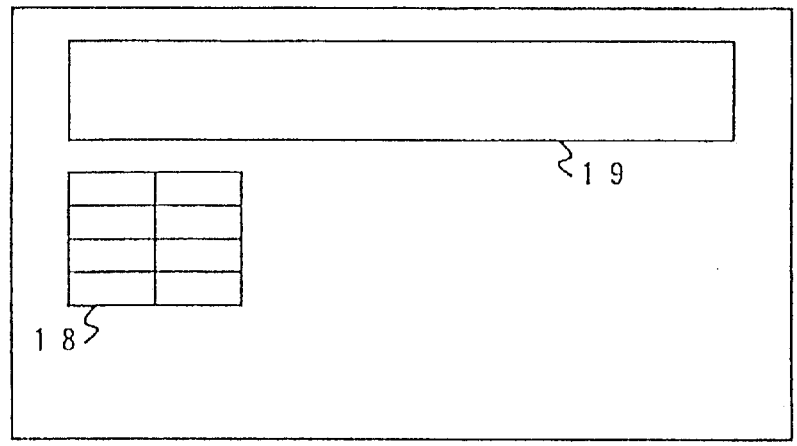
FIG. 7 is a view showing an external appearance of the IC card of the present invention.
Figure 8:
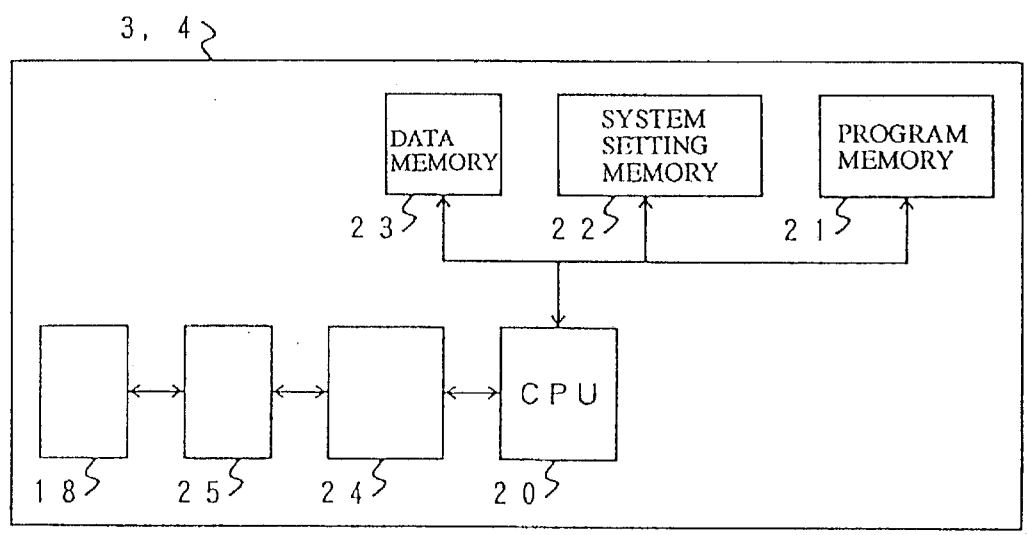
FIG. 8 is a block diagram of the inside of the IC card of the present invention.

Described hereinafter is an explanation of the customer's card and ATM card supplied to the transaction processing system of the present invention. As described above, it is possible to change the customer's card and ATM card in various shapes as well as a card shape. However, the following is an explanation of these cards in the card shape. Also, the customer's card and ATM card are explained as having the same external appearance and internal configuration. FIG. 7 shows the external appearance of the IC card, and FIG. 8 shows an internal configuration of the IC card.

In FIG. 7, denoted by 18 is a contact and 19 is an indication part.

The contact 18 is a section whose terminal is exposed and is connected with the reader-writer of the ATM 2 (customer's card reader-writer 9, when the card is the customer's card 3, and the ATM card reader-writer 10, when the card is ATM card 4).

The indication part 19 is a section which visually indicates information. The customer's card 3 and the ATM card 4 have the indication part 19, respectively. Accordingly, they can indicate information related to the transaction processing, for example, information on final transaction, renewal balance, transaction processing history, contents of errors, special informed items, etc. For this reason, customers and clerks in charge can simply check the transaction processing result, can carry out the accounting, and can check the contents of errors, etc.

Also, various methods of indicating information are considered in respect of the indication part 19. For example, a color medium, which emits colors in accordance with heat and pressure, can be attached to or buried as an indication method in the indication part 19. It is also considered as an indication method that magnetic powder is sealed with transparent plastics in holes bored in cards, and these holes are aligned by applying the patterned magnetic force to them. In addition, it is considered as an indication method that a display such as an LCD (Liquid Crystal Display), etc., is buried in the indication part 19.

When the indication part 19 is an indication method using a color medium or magnetic powder, a rewritable medium should be used in the indication part 19 of the customer's card 3 and the ATM card 4, because it is desirable to use the indication part 19 twice or more. In this case, the ATM 2 must have a printing method (not shown) used to apply the heat, pressure, or magnetic force to the customer's card 3 and the ATM card 4.

When the indication part 19 is an indication method using a display, the customer's card 3 and the ATM card 4 will store therein information related to transactions in their memories (data memory described later on), and will indicate information in the indication part 19, wherein the information is selected in advance from the information related to the transactions, and it particularly means information on transaction processing history, renewal balance, etc. Also, the customer's card 3 and the ATM card 4 are designed so that the contents of indication part 19 can be changed with a switch. Therefore, customers and clerks in charge can obtain various information from these contents. This can be realized, for example, if these cards have an indication switching part (not shown) on their surfaces, wherein indications are inputted in the indication switching part to switch the contents of the indications in sequence. In addition, the indication part 19 of these cards can be designed so that it can be operated under fixed conditions to prevent information from leaking to a third party and to prevent them from being illegally used by such a third party. This can be realized, for example, if these cards have a memory (data memory 23 described later), an input part (not shown), and a comparison part (a part of CPU 20 described later). With regard to the above structure, the memory stores ID numbers determined in advance, these ID numbers are inputted from the input by customers or clerks in charge, and the comparison part makes a comparison between the ID numbers stored in the memory and those inputted from the input part. As a result of the comparison, when the ID numbers agree with each other, the indication part 19 can be operated.

In FIG. 8, denoted by 20 is a CPU 20, 21 is a program memory, 22 is a system setting memory, 23 is a data memory, 24 is a communication circuit, and 25 is a coding-decoding circuit. Also, the program memory 21, the system setting memory 22, and the data memory 23 shown in FIG. 8 are expressed independently and separately from each other, but actually they are inseparable from each other. These memories can have volatile and non-volatile areas, respectively.

The CPU 20 is a control part which processes various programs determined arbitrarily by card suppliers, card issuers, etc. Various programs are for example, program for checking the genuineness of machines or IC cards, program for identifying the authentication transmitted from host computer 1 or ATM 2, program for directly transacting and processing between customer's card 3 and ATM card 4, program for indicating information to indication part 19, program where the card itself locks a part of the other program depending on the number of errors, and program for releasing the locked program.

The program memory 21 is a memory which stores the information and program prepared by card suppliers who are suppliers mainly of systems. Usually, this program is indispensable for operating the transaction processing system.

The system setting memory 22 is a memory which stores therein the information and program prepared mainly by card issuers. Usually, this program is for operating the services determined arbitrarily by card issuers, and is for stipulating the input and output of specific information.

The data memory 23 is a memory which stores therein information on system codes (financial institution codes), card numbers, ID numbers, electronic money, etc.

The communication circuit 24 is a circuit which controls the communications with the outside.

The coding-decoding circuit 25 is a circuit which codes and decodes information transmitted and received by communications with the outside. Owing to this circuit, the transaction processing system of the present invention can prevent secrets from leaking. Also, various methods are considered to code and decode information. For example, it can be realized in such a manner that an electronic key information is set to decipher information, and the card at the receiving side has the electronic key information.

(Procedure for Starting Transaction Processing System)

Described hereinafter is a process of starting the transaction processing system of the present invention.

Step 1

When a clerk in charge connects the ATM card 4 to the ATM card reader-writer 10 of the ATM 2, the ATM 2 and the ATM card 4 will authenticate with each other (hereafter called, "Mutual Authentication"). The mutual authentication is to check the genuineness of each other. That is, the ATM 2 checks to ensure that the ATM card 4 connected at present is the genuine ATM card, i.e., it is neither a forged nor falsified second card, and the ATM card 4 checks to ensure that the ATM 2 connected at present is a genuine transaction machine. When mutual authentication between the ATM 2 and the ATM card 4 is carried out, the process goes to step 2. On the other hand, when the mutual authentication is not carried out, a signal will be transmitted to the outside monitoring terminal (not shown) or the like so that a clerk in charge can connect the ATM 2 and the ATM card 4 on the basis of procedures determined in advance.

Step 2

When the mutual authentication finishes, host computer 1 will check to ensure that the ATM card 4 is genuine. After the checking, the process goes to step 3. On the other hand, when the host computer 1 judges that the ATM card 4 is not genuine, the host computer 1 will transmits a signal which means "Abnormality" of the ATM card 4 to the ATM 2. The ATM 2 which receives this signal indicates on the indication part of the clerk operating part 8 so that a clerk can replace the abnormal ATM card 4 with a new one or can check the abnormal ATM card 4 itself.

Step 3

The host computer 1 registers a state where the ATM 2 can presently carry out the transaction processing by means of electronic money, and transmits to the ATM 2, a signal which means that the ATM card 4 is genuine.

Step 4

When the ATM card 4 receives the signal which means that it is genuine from the host computer 1, it releases, for example, a lock applied to a program for transferring the electronic money. Then, the ATM card 4 can carry out the transaction processing, and the starting of the transaction processing system will finish. Once the ATM card 4 is in a state where it can carry out the transaction processing, the state will continue unless a clerk in charge inputs an instruction to stop the transaction processing on the basis of procedures determined in advance, the ATM card 4 is removed from the ATM 2, or the power source of the ATM 2 is turned off.

With the above mentioned processes, the starting of the transaction processing system is finished.

(Procedures for Transaction Processing of Transaction Processing System)

Described hereinafter is an explanation of the transaction processes by electronic money in the transaction processing system of the present invention.

The transaction processing system of the present invention includes a process where the transaction machine (2) checks the genuineness of the first card (4), a process where the transaction machine (2) accesses the account stored in the host computer (1), a process where the transaction machine (2) checks to ensure that the card holder is a customer in person, a process where the host computer (1) authenticates the transaction processing carried out between the first card (3) and the second card (4), and transmits a signal for authenticating the transaction processing to the first and second cards, and a process where after the first card (3) and the second card (4) authenticate each other on the basis of signals for authenticating the transaction processing received from the host computer (1), they mutually transfer information which directly shows the monetary value. The transaction processing system is characterized in that when the transaction processing starts between the first card (3) and the second card (4), the transaction machine (3) will relay until it receives a signal indicating the finish of transfer of information on a monetary value between the first and second cards without any interposition of signals inputted and outputted between the first and second cards in the transaction processing.

In addition, the transaction processing system of the first embodiment is characterized in that information on monetary values is stored in the second card (4) in advance.

Described hereinafter is an explanation of procedures for transaction processing by the electronic money in the first embodiment with reference to FIGS. 1 and 2.

FIGS. 1 and 2 show cases when the transaction processing is payment and deposit. First, the case of the payment is explained with reference to FIG. 1.

Step 5

Customers select the contents of the transaction processing at the transaction processing. FIG. 1 shows when a customer selects payment by electronic money. Accordingly, the instruction that the electronic money is selected and paid by the customer is inputted from the customer operating part 7 to the ATM 2 (process of "selection of electronic money" (process of "payment of electronic money")). The ATM 2 switches its functions by itself on the basis of this instruction so that the transaction processing can be carried out by using electronic money. It is also possible to omit the process of selection of the electronic money.

Step 6

After the process of selection of electronic money (the process of payment of electronic money), the customer card 3 will be inserted in the customer card reader-writer 9 of the ATM 2. The ATM 2 detects that the customer card 3 is inserted therein by means of a sensor installed in the vicinity of the customer card reader-writer 9. (process of "Insertion of Cards")

Step 7

After the process of "Insertion of Cards", the ATM 2 connects a pin terminal to the contact 18 of the customer card 3 to electrically connect to the customer card 3. In addition, the ATM 2 supplies an electric source to the customer card 3, and transmits a reset signal thereto (process of "Answer to Reset").

Step 8

After the process of "Answer to Reset", the ATM 2 and the customer card 3 authenticate each other (process of "Mutual Authentication"). This mutual authentication means checking of mutual genuineness. That is, the ATM 2 checks to ensure that the customer card 3 connected at present is genuine, i.e., is neither a first forged card nor a first falsified card, and the customer card 3 checks to ensure that the ATM 2 connected at present is a genuine transaction machine.

Step 9

After the process of "Mutual Authentication", the ATM 2 reads the information, electronic money, etc., necessary for transactions, and also reads the information for accessing the account of customers from the customer card 3, and transmits this information to the host computer 1 (process of "Card Reading Data").

Step 10

After the process of "Card Reading Data", the host computer 1 accessing the account of the customer stored in the host computer 1, and checks to see if it is possible to carry out transactions. When the host computer 1 checks to ensure that it is possible to do so, the host computer 1 transmits a "Transactable" signal to the ATM 2 and will makes the ATM 2 continue the processing (process of "Transactable"). The process goes to Step 11. On the other hand, when the host computer 1 judges that it is impossible to carry out transactions, the host computer 1 transmits a "Untransactable" signal to the ATM 2 and makes the ATM 2 discontinue the processing. Also, the following items can be considered as "Untransactable" cases, namely, the customer card 3 does not correspond to the account, the card has a trouble, for example, it is a stolen card, and the card is not linked up with any card issuers.

Step 11

After the process of "Transactable", the ATM 2 turns on the indication part of the customer operating part 7 so that customers input their ID numbers (customer ID) specified in advance every customer card 3 by them. The customer ID is inputted by the customer in the ATM 2 on the basis of this indication (process of "Input Customer ID"). The ATM 2 transfers the customer ID to the host computer 1 (process of "Transfer of Customer ID"). When the customer ID is coded by algorithm determined in advance, transmitted-received signals may include information on electronic keys for decoding the code number other than that of the customer ID.

Step 12

After the process of "Transfer of Customer ID", the host computer 1 checks to see if the customer ID, which is inputted by the customer on the basis of information stored in the account of the customer, is correct. When the host computer 1 judges that the customer ID is correct, i.e., that the card holder is the customer in person, it transmits a signal of "OK" to the ATM 2 (process of "OK"). The ATM which receives this OK signal transmits the customer ID to the customer card 3 (process of "Transfer of Customer ID"). The process goes to Step 13. On the other hand, when the host computer 1 judges that the customer ID is wrong, it transmits a signal of "ERROR" to the ATM 2. The ATM 2 which receives this "ERROR" signal turns on the indication part of the customer operating part 7 so that the customer again inputs his (her) customer ID or stops transaction processing. Also, this ERROR signal is outputted from the ATM 2 to the customer card 3, and when the ERROR signals are inputted continuously by a specified number, i.e., when the customer continuously inputs a specific number of customer IDs by mistake, the customer card 3 locks the program for transferring the electronic money.

Step 13

After the process of "Transfer of Customer ID", the customer card 3, upon reception of the customer ID, makes a comparison between this customer ID and a customer ID stored in the customer card 3, and when the two customer IDs agree with each other, the customer card 3 transmits a signal of "OK" to the ATM 2 which enables the customer card 3 itself to carry out the transaction processing (process of "OK"). The process goes to Step 14. On the other hand, when the above two customer IDs do not agree with each other, the customer card 3 transmits the signal of ERROR to the ATM 2. The ATM 2, upon reception of this ERROR signal, turns on the indication of the customer operating part 7 so that the customer again inputs his (her) customer ID or he (she) stops the transaction processing. Or the ATM 2 transmits an information signal for calling a clerk in charge to the monitoring terminal or the like.

Step 14

After the process of "OK", the ATM 2 turns on the indication part of the customer operating part 7 so that the customer inputs the amount of money to be paid. This amount is inputted by the customer in the ATM 2 on the basis of this indication (process of "Input of Amount of Money to be Paid"). When the amount is inputted by the customer, the ATM 2 transfers the amount to the host computer 1 (process of "Transfer of Amount of Money to be Paid").

Step 15

After the process of "Transfer of Amount of Money to be Paid", the host computer 1 checks to see if it is possible to pay the amount of money on the basis of information stored in the account of the customer. When the host computer 1 checks to ensure that it is possible to do so, the host computer 1 will hypothetically pay the money to the account of the customer, and makes the customer card 3 continue the transaction processing by sending the ATM 2 a signal for authenticating the payment carried out between the customer card 3 and the ATM card 4 (process of "Instruction of Payment"). The process goes to Step 17. Also, the signal for authenticating the payment includes a signal for instructing that the electronic money equivalent to the money paid to the customer card 3 is received from the ATM card 4, and includes another signal for instructing that the electronic money equivalent to the money paid to the ATM card 4 is transmitted to the customer card 3. On the other hand, when the host computer 1 judges that it is impossible to carry out the payment, it transmits a signal representing "Non-payable" to the ATM 2. The ATM 2, upon reception of this signal, turns on the indication part of the customer operating part 7 so that the customer newly inputs the payment or stops the transaction processing.

Step 16

After the process of "Instruction of Payment", the ATM 2 transmits a signal, representing an instruction that an electronic money included in a signal for authenticating the payment, which is equivalent to the money paid to the customer card 3 is received from the ATM card 4, is received from the ATM card 4, to the customer card 3 (process of "Instruction of Receipt of Money"), and it also transmits a signal, representing an instruction that the electronic money, which is equivalent to the money paid to the ATM card 4 included in a signal for authenticating the processing of payment, is transmitted to the customer card 3. The customer card 3 and the ATM card 4 receive these signals directly and mutually carry out the transaction processing by means of electronic money. As a result, the ATM 2 relays signals transmitted and received between the customer card 3 and the ATM card 4 without any interposition in the transaction processing. That is, the ATM 2 does not control the transaction processing, but the customer card 3 or the ATM card 4 controls it.

Step 17

After the processes of "Instruction of Receipt of Money" and "Instruction of Payment", the customer card 3 and the ATM card 4 authenticate each other (Process of "Mutual Authentication"). This mutual authentication means checking of genuineness each other. Also, when communications between them are coded by an algorithm determined in advance in this process, transmitted and received signals may include information on electronic keys for decoding these communications.

Step 18

After the process of "Mutual Authentication", the customer card 3 and the ATM card 4 transfer the present balance (process of "Transfer of Present Balance"). In this process, the present balance before the transaction processing is checked to prevent errors occurring before and after the transaction processing or to cancel the transaction processing when an error occurs.

Step 19

After the process of "Transfer of Present Balance", the ATM card 4 transfers the electronic money equivalent to the payment to the customer card 3, and the customer card 3 receives the electronic money equivalent to the payment from the ATM card 4 (process of "Payment").

Step 20

After the process of "Payment", the customer card 3 and the ATM card 4 mutually read the balance renewed from respective data memories 23, and transfer it to each other (process of "Transfer of New Balance").

Step 21

After the process of "Transfer of New Balance", the customer card 3 and the ATM card 4 mutually check to ensure that there is no error before and after the transaction processing. When they mutually check no error, they transmit a signal of "OK" to each other (process of "OK"). The customer card 3 and the ATM card 4 will confirm and renew the balance on the basis of the OK signal received from the other. The process goes to Step 23. On the other hand, when either the customer card 3 or the ATM card 4 judges that there is an error before and after the transaction processing, the card which finds out the error transmits a signal of "ERROR" to other card. Accordingly, the customer card 3 and the ATM card 4 repeat processes subsequent to "Mutual Authentication" mentioned in Step 18 or those subsequent to "Transfer of Present Balance" mentioned in Step 19. As a result of repeating these processes, when either the customer card 3 or the ATM card 4 judges again that there is an error before and after the transaction processing, the card which finds out the error transmits a signal of "ERROR" to the host computer 1. The host computer 1 which receives this ERROR signal sends the ATM 2 a signal representing that there is a trouble in the transaction processing between the customer card 3 and the ATM card 4. The ATM 2, upon reception of this signal, displays the indication part of the customer operating part 7 so that the customer is on standby, because he (she) cannot carry out the transaction processing, and the ATM 2 transmits an information signal for calling a clerk in charge to the external monitoring terminal or the like.

Step 22

After the process of "OK", the customer card 3 transmits a signal and the balance to the ATM 2, wherein the signal shows that the receipt of money has been finished, and the balance is read from the data memory 23 and is renewed after the transaction processing (process of "Finish of Receipt of Money and Transfer of New Balance"). The ATM card 4 transmits a signal and the balance to the ATM 2, wherein the signal shows that the payment has been finished, and the balance is read from the data memory 23 and is renewed after the transaction processing (process of "Finish of Payment and Transfer of New Balance").

Step 23

After the processes of "Finish of Receipt of Money and Transfer of New Balance" and "Finish of Payment and Transfer of New Balance", the ATM 2, upon reception of these signals, transmits the signal of "OK" to the customer card 3 and the ATM card 4. The transaction processing between the customer card 3 and the ATM card 4 is finished with this transaction.

Step 24

After the process of "OK", when the indication part 19 of the customer card 3 is an indication part using a medium which develops colors in accordance with the previously mentioned heat, pressure, etc., the ATM 2 prints the balance renewed after the transaction processing on the indication part 19 (process of "New Balance"), and prints the contents of the transaction processing on a journal and on an itemized account. Also, when the indication part 19 of the customer card 3 is an indication part using the previously mentioned display, this process shows the balance, which is renewed after the transaction processing, and the CPU 20 of the customer card 3 reads out the balance from the data memory 23, on the indication part 19.

Step 25

After the process of "Printing of New Balance", the ATM 2 discharges the customer card 3 and the itemized account (process of "Discharge of Card and Issue of Itemized Account").

Step 26

After the process of "Discharge of Card and Issue of Itemized Account", the ATM 2 transmits a signal, representing the finish of the transaction processing, to the host computer 1 (process of "Finish of Transaction"). The host computer 1, upon reception of the signal settles and renews hypothetical payment carried out for the account of the customer.

The transaction processing for the payment is finished with the above processes.

A case of deposit will be now described with reference to FIG. 2.

Step 27

First, the customer selects the contents of the transaction processing. In FIG. 2, the customer selects a deposit by electronic money. Accordingly, an instruction of this deposit will be inputted from the customer operating section 7 to the ATM 2 (process of "Selection of Electronic Money" [Deposit by Electronic Money]). This process goes to Step 28. The processes mentioned from Steps 28 to 35 are the same as those mentioned from Steps 6 to 13 shown in FIG. 1.

Step 28

This step carries out the same processing as that of Step 6 shown in FIG. 1 (process of "Insertion of Card").

Step 29

This step carries out the same processing as that of Step 7 shown in FIG. 1 (process of "Answer to Reset").

Step 30

This step carries out the same processing as that of Step 8 shown in FIG. 1 (process of "Mutual Authentication").

Step 31

This step carries out the same processing as that of Step 9 shown in FIG. 1 (processes of "Reading of Card" and "Card Reading Data").

Step 32

This step carries out the same processing as that of Step 10 shown in FIG. 1 (process of "Transactable").

Step 33

This step carries out the same processing as that of Step 11 shown in FIG. 1 (process of "Transfer of Customer ID").

Step 34

This step carries out the same processing as that of Step 12 shown in FIG. 1 (process of "OK").

Step 35

This step carries out the same processing as that of Step 13 shown in FIG. 1 (process of "OK").

Step 36

After the process of "OK", the ATM 2 turns on the indication part of the customer operating part 7 so that the customer inputs the amount of deposit. The amount of the deposit is inputted by the customer in the ATM 2 on the basis of this indication (process of "Input of Amount of Deposit").

Step 37

After the process of "OK", the ATM 2 turns on the indication part of the customer operating part 7 so that the customer inputs the amount of deposit. The amount of the deposit is inputted by the customer in the ATM 2 on the basis of this indication (process of "Input of Amount of Deposit"). When the amount of the deposit is inputted by the customer, the ATM 2 transfers the amount of the deposit to the host computer 1 (process of "Transfer of Amount of Deposit").

Step 38

After the process of "Transfer of Amount of Deposit", the host computer 1 carries out hypothetical deposit processing to the account of the customer, transmits a signal to the ATM 2, and makes the ATM 2 continue processing, wherein this signal is for authenticating the deposit processing carried out between the customer card 3 and the ATM card 4 (process of "Indication of Deposit"). The process goes to Step 39. Also, the signal for authenticating this payment includes the following signals, namely, a signal which indicates that the electronic money equivalent to the amount of deposit to the customer card 3 is transmitted to the ATM card 4, and a signal which indicates that the electronic money equivalent to the amount of deposit to the ATM card 4 is received from the customer card 3.

Step 39

After the process of "Instruction of Deposit", the ATM 2 transmits a signal to the customer card 3, wherein the signal indicates that the electronic money is transmitted to the ATM card 4, wherein the electronic money is equivalent to the amount of deposit to the customer card 3 included in a signal which authenticates the deposit processing (process of "Instruction of Deposit"). In addition, the ATM 2 transmits a signal to the ATM card 4, wherein the signal indicates that the electronic money is received from the customer card 3, and this electronic money is equivalent to the deposit to the ATM card 4 included in a signal which authenticates the deposit processing. The customer card 3 and the ATM card 4 which receive these indications will directly and mutually carry out the transaction processing by using electronic money. The process goes to Step 40. The processes mentioned from Steps 40 to 42 are the same as those mentioned from Steps 17 and 18 shown in FIG. 1.

Step 40

This step carries out the same processing as that of Step 17 shown in FIG. 1 (process of "Mutual Authentication").

Step 41

This step carries out the same processing as that of Step 18 shown in FIG. 1 (process of "Transfer of Present Balance").

Step 42

After the process of "Present Balance", the customer card 3 transfers the electronic money equivalent to the amount of deposit to the ATM card 4, and the ATM card 4 receives the electronic money equivalent to the amount of the deposit from the customer card 3 (process of "Depositing"). The process goes to Step 43. The processes mentioned in Steps 43 and 44 are the same as those mentioned in Steps 20 and 21 shown in FIG. 1.

Step 43

This step carries out the same processing as that of Step 20 shown in FIG. 1 (process of "Transfer of New Balance").

Step 44

This step carries out the same processing as that of Step 21 shown in FIG. 1 (process of "OK").

Step 45

After the process of "OK", the customer card 3 transmits a signal and a balance to the ATM 2, wherein this signal indicates the finish of the deposit, and this balance is renewed after the transaction processing read from the data memory 23 (process of "Finish of Deposit and Transfer of New Balance"). The ATM card 4 will transmit a signal and a balance to the ATM 2, wherein this signal indicates the finish of the receipt of money, and this balance is renewed after the transaction processing read from the data memory 23 (process of "Finish of Receipt of Money and Transfer of New Balance"). The process goes to Step 46. The processes mentioned from Steps 46 to 49 are the same as those mentioned from Steps 23 to 26 shown in FIG. 1.

Step 46

This step carries out the same processing as that of Step 23 shown in FIG. 1. (process of "OK").

Step 47

This step carries out the same processing as that of Step 24 shown in FIG. 1 (process of "Printing of New Balance").

Step 48

This step carries out the same processing as that of Step 25 shown in FIG. 1 (process of "Discharge of Card and Issue of Itemized Account").

Step 49

This step carries out the same processing as that of Step 26 shown in FIG. 1 (process of "Finish of Transaction").

The transaction processing in the case of the deposit is finished with the above processes.

As previously mentioned, the transaction machine (2) checks the genuineness of the first card (4) in the process. This process is equivalent to the process of "Mutual Authentication" mentioned in Step 8 or that mentioned in Step 30. As previously mentioned, the transaction machine (2) accessing the account stored in the host computer (1) in the process. This process is equivalent to the process of "Reading of Card" and "Card Reading Data" mentioned in Step 9 or that mentioned in Step 31. As mentioned previously, the transaction machine (2) checks to ensure that the card holder is a customer in person in the process. This process is equivalent to the processes from "Input of Customer ID" mentioned in Step 11 to "OK" mentioned in Step 12, or to those from "Input of Customer ID" mentioned in Step 35 to "OK" mentioned in Step 36. As mentioned previously, the host computer (1) authenticates the transaction processing carried out between the first card (3) and the second card (4), and transmits a signal for authenticating the transaction processing to these cards in the process. This process is equivalent to the process of "Instruction of Payment" mentioned in Step 15 or "Instruction of Deposit" mentioned in Step 38. As mentioned previously, after the first card (3) and the second card (4) authenticate each other on the basis of a transaction processing authentication signal received from the host computer (1), they mutually transfer information which directly instructs the monetary value in the process. This process is equivalent to processes from "Instruction of Payment" and "Instruction of Receipt of Money" mentioned in Step 16 to "Payment Transaction mentioned in Step 19, or to those from "Indication of Deposit" and "Indication of Receipt of Money" mentioned in Step 39 to "Deposit Transaction" mentioned in Step 42.

(Transaction Processing System and Effects of Transaction Processing Method)

The following various effects can be obtained from the transaction processing system and the transaction processing method of the present invention mentioned previously.

The transaction processing system and the transaction processing method of the present invention are characterized in that the transaction processing is executed by transferring the electronic money. For this reason, the ATM 2 (transaction machine), which is also a general-purpose product made by the participation of many manufacturers, is not designed to generate any electronic money. The ATM 2 is not related to any transaction processing by electronic money transferred between the customer card 3 (the first card) and the ATM card 4 (the second card). That is, the transaction machine is not designed to control the transaction processing, and the first or the second card is designed to do so. Accordingly, the transaction processing is carried out by directly transferring the electronic money between the first and the second cards. In addition, the first and second cards can be manufactured as respective products by a manufacturer, system programs can be set by card suppliers, and original user programs can be set by financial institutions, etc. Therefore, only limited persons can know the mechanism of transferring of the electronic money. As a result, it is possible to ensure high security in the same way as that of the host computer, nevertheless the transaction processing system and the transaction processing method described in the present invention incorporate therein a general-purposed product.

Also, the system and method of the present invention are also characterized in that the amount of money is newly increased or decreased by transacting and processing the account stored in the host computer through the transfer of the electronic money between the first and the second cards. Therefore, the system and method of the present invention mean that the transaction processing actually transfers assets owned by card issuers or financial institutions which are their cooperators. That is, the settlement of accounts is completed immediately in financial institutions. Also, financial institutions can simply carry out the accounting, because they can check the amount of money transferred through the electronic money by checking the second card. As a result, the system and method of the present invention allow financial institutions to save labor on accounting.

In addition, the feature of the above system and method of the present invention is characterized in that the host computer only authenticates the transaction processing between the first and the second cards at the transfer of the electronic money. Accordingly, it is possible to allot to the second card the processing carried out only by the host computer, for example, charging of electronic money to the first card, checking of errors before and after transaction processing, etc. Therefore, a burden of the host computer is lightened. As a result, the system and method of the present invention allow the host computer to carry out a large quantity of transaction processing.

(Summary of the second Embodiment of Transaction Processing System)

Although the first embodiment of the transaction processing system and transaction processing method of the present invention has been explained up to now in detail, there remains in the first embodiment a problem that when the ATM card 4 is stolen, financial institutions will be damaged monetarily. There remains also a problem that programs of the ATM card 4 require much labor for new ideas and preparations and an excessive mechanism must be set uselessly in the ATM 2 to ensure the security. Then, the second embodiment is offered to solve these problems.

The transaction processing system of the second embodiment is characterized in that information on monetary values is not stored in the second card (4) in advance, and information on monetary values, which is transferred from the host computer (1) or the first card (3) to the second card (4), is transmitted to the first card (3) or the host computer (1). That is, the electronic money is not stored in the ATM card 4, but it is received for every transaction processing from the host computer 1 or the customer card 3, and is transmitted to the customer card 3 or the host computer 1 within the transaction processing.

In order to carry out the transaction processing shown in the second embodiment, it is necessary for the host computer 1 to strictly control the ATM card 4, because when the ATM card 4 is not genuine, i.e., when it is falsified or forged, and when the electronic money is transferred between the ATM 2 and the illegal ATM card, a mechanism for transferring the electronic money may be analyzed. Accordingly, it is necessary for the host computer 1 to check to ensure that a genuine ATM card 4 is connected to a genuine ATM 2 in advance when the transaction processing is carried out. However, when such checking work is carried out for every transaction processing, much time will be required for the transaction processing. Then, when the host computer 1 checks to ensure that a genuine ATM card 4 is connected to the ATM 2, it receives a signal from the ATM card 4, and checks the signal, wherein this signal shows that a genuine ATM card 4 is connected continuously to a genuine ATM 2 at the transaction processing. This will economize the transaction processing time. Such a transaction is carried out in the following manner.

(Transaction Processing Procedures of Transaction Processing System in the second Embodiment)

Before the transaction processing, first there is executed a processing that the ATM card ID is given to the ATM card 4.

Described hereinafter is an explanation of the processing of the ATM card ID given to the ATM card 4.

Step 50

When the host computer 1 and the ATM 2 are connected to each other by a clerk in charge on the basis of procedures determined in advance, they authenticate each other. Mutual authentication means that the host computer 1 checks to ensure that the ATM 2 is genuine, and the ATM 2 checks to ensure that the host computer 1 is genuine. When the mutual authentication is carried out between the host computer 1 and the ATM 2, the process goes to Step 51. On the other hand, when the mutual authentication is not carried out between them, a signal is transmitted to the external monitoring terminal, etc., wherein this signal indicates a clerk in charge connects the host computer 1 with the ATM 2 on the basis of procedures determined in advance.

Step 51

When the mutual authentication between the host computer 1 and the ATM 2 is finished, the ATM 2 transmits a code (hereafter called, "ATM Code") set for every ATM 2 to the host computer 1, the host computer which receives the ATM code from the ATM 2 stores the ATM code.

Step 52

When the ATM 2 and ATM card 4 are connected to each other by a clerk in charge on the basis of procedures determined in advance, they certify each other. When the mutual authentication between them is carried out, the process goes to Step 53. On the other hand, when the above mutual authentication is not carried out, the ATM 2 will transmit a signal to the external monitoring terminal, etc., wherein this signal indicates a clerk in charge connects the ATM 2 with the ATM card 4 on the basis of procedures determined in advance.

Step 53

When the mutual authentication between ATM 2 and ATM card 4 is finished, the system code (financial institution code) key (not shown) installed on the input of the clerk operating part 8 of the ATM 2 is ready to be inputted. This system code key reads system codes stored in the ATM card 4, and instructs that the system code is transmitted to the host computer 1. When the system code key is inputted by the clerk in charge, the ATM 2 reads the system code from the ATM card 4, transmits the system code to the host computer 1, and transmits the ATM code of the ATM 2.

Step 54

The host computer 1, upon reception of the system code and the ATM code from the ATM 2 and the ATM card 4, checks to see whether or not the system code is appropriate. When the host computer 1 checks to ensure that the system code is appropriate, it prepares ID code (hereafter called, "ATM card ID") different for every ATM card 4, stores the ATM card ID while making correspondence to the ATM code, and transmits the ATM card ID to the ATM card 4 by way of the ATM 2.

Step 55

The ATM card 4, upon reception of the ATM card ID from the host computer 1, stores this ATM card ID in the memory (data memory 23).

The granting of the ATM card ID is finished with the above processes.

Next, there is executed a procedure for checking (hereinafter referred to as a checking process) to ensure that the genuine ATM card 4 remains connected to the genuine ATM 2 at the transaction processing.

The checking will be now described with reference to FIG. 9.

Figure 9:
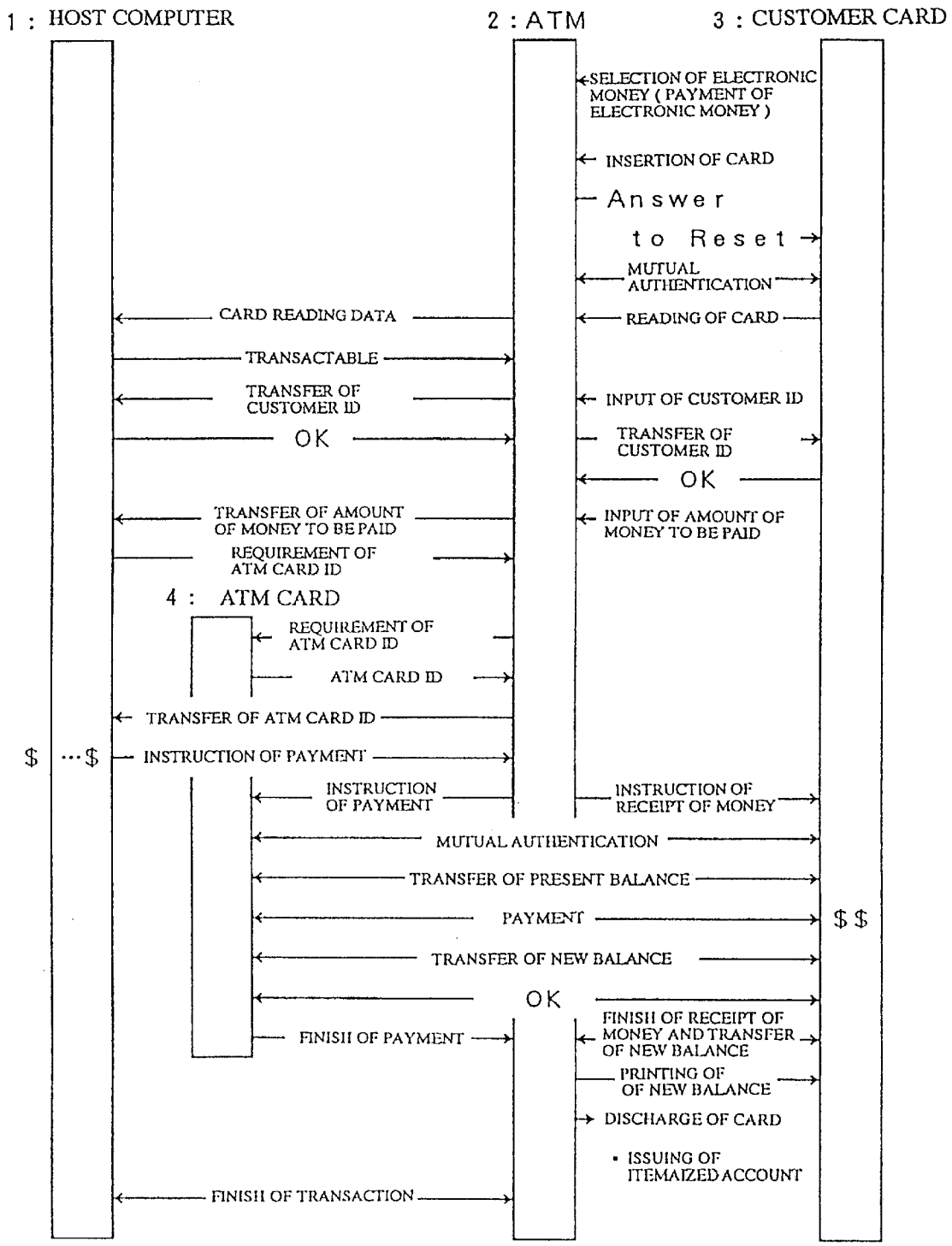
FIG. 9 shows procedures for transaction processing in the second embodiment of the present invention.

FIG. 9 shows procedures for the transaction processing by the electronic money. Also, the following procedures from Steps 56 to 65 are the same as those from Steps 5 to 14 shown in FIG. 1 of the first embodiment.

Step 56

This step carries out the same processing as that of Step 5 shown in FIG. 1 (process of "Selection of Electronic Money and Payment of Electronic Money").

Step 57

This step carries out the same processing as that of Step 6 shown in FIG. 1 (process of "Insertion of Card").

Step 58

This step carries out the same processing as that of Step 7 shown in FIG. 1 (process of "Answer to Reset").

Step 59

This step carries out the same processing as that of Step 8 shown in FIG. 1 (process of "Mutual Authentication").

Step 60

This step carries out the same processing as that of Step 9 shown in FIG. 1 (processes of "Reading of Card" and "Card Reading Data").

Step 61

This step carries out the same processing as that of Step 10 shown in FIG. 1 (process of "Transactable").

Step 62

This step carries out the same processing as that of Step 11 shown in FIG. 1 (processes of "Input of Customer ID" and "Transfer of Customer ID").

Step 63

This step carries out the same processing as that of Step 12 shown in FIG. 1 (processes of "OK" and "Transfer of Customer ID").

Step 64

This step carries out the same processing as that of Step 13 shown in FIG. 1 (process of "OK").

Step 65

This step carries out the same processing as that of Step 14 shown in FIG. 1 (processes of "Input of Amount of Money to be Paid" and "Transfer of Amount of Money to be Paid").

Step 66

After the process of "Transfer of Amount of Money to be Paid", the host computer 1 checks to see if it is possible to pay the money from information stored in the account of the customer. When the host computer 1 checks to ensure that it is possible to do so, the host computer 1 transmits a signal to the ATM 2, wherein this signal means the requirement of transmission of the ATM card ID (process of "Requirement of ATM card ID").

Step 67

After the process of "Requirement of ATM card ID", the ATM 2 receives a signal from the host computer 1, wherein this signal means the requirement of the transmission of the ATM card ID, then it transmits the signal to the ATM card 4 (process of "Requirement of ATM card ID").

Step 68

After the process of "Requirement of ATM card ID", the ATM card 4 receives a signal from the ATM 2, wherein this signal means the requirement of the transmission of ATM card ID, then it transmits the ATM card ID to the ATM 2, wherein the ATM card ID is in the data memory 23 of the ATM card 4 (process of "ATM card ID").

Step 69

After the process of "ATM card ID", the ATM 2 receives the ATM card ID from the ATM card 4, then it transmits the ATM code, which is stored in the ATM 2, together with the ATM card ID, which is received from the ATM card 4, to the host computer 1 (process of "Transfer of ATM card ID").

Step 70

After the process of "Transfer of "ATM card ID", the host computer 1 receives the ATM code and the ATM card ID from the ATM 2, and it compares a combination of the received ATM code and the ATM card ID with that stored therein. When the two combinations agree with each other, the host computer 1 judges that the genuine ATM card 4 is connected continuously to the genuine ATM 2, carries out the hypothetical payment to the account of the customer, transmits a signal, representing authentication of the payment to be carried out between customer card 3 and the ATM card 4, to the ATM 2, and executes the transfer of the electronic money between the customer card 3 and the ATM card 4 (process of "Indication of Payment"). The process goes to Step 71. Also, the signal which authenticates the process of payment includes a signal, the other signal, and the electronic money to the ATM card 4, wherein the signal indicates that the electronic money equivalent to the amount of money paid to the customer card 3 is received from the ATM card 4, and the other signal indicates that the electronic money equivalent to the amount of money paid to the ATM card 4 is received from the host computer 1 and is transmitted to the customer card 3. On the other hand, when the two combinations do not agree with each other, the host computer 1 judges that the ATM card 4 has been replaced with others without any authentication of the host computer 1, and transmits a signal of "ERROR" to the ATM 2. The ATM 2, upon reception of the signal of "ERROR" from the host computer 1 discontinues the transaction processing, and transmits a signal to the external monitoring terminal or the like, wherein this signal indicates a clerk in charge connects the ATM 2 and the ATM card 4 on the basis of procedures determined in advance.

The checking process is finished with the above processes. Described hereinafter is an explanation of the transfer of electronic money between the customer card 3 and the ATM card 4.

Step 71

After the process of "Indication of Payment", the ATM 2 transmits a signal to the customer card 3, wherein this signal indicates that the electronic money equivalent to the amount of money paid to the customer card 3 included in a signal for authenticating the payment is received from the ATM card 4 (process of "Indication of Receipt of Money"). The ATM 2 also transmits a signal and the electronic money addressing to the ATM card 4 to the ATM card 4 wherein this signal indicates that the electronic money equivalent to the amount of money paid to the ATM card 4 included in a signal for authenticating the payment is received from the host computer 1 and is transmitted to the customer card 3 (process of "Indication of Payment"). The customer card 3 and the ATM card 4 receiving these signals mutually and directly carry out the transaction processing by means of the electronic money. The process goes to Step 72. Processes from Steps 72 to 76 are the same as those from Steps 17 to 21 shown in FIG. 1 of the first embodiment.

Step 72

This step carries out the same processing as that of Step 17 shown in FIG. 1. (process of "Mutual Authentication")

Step 73

This step carries out the same processing as that of Step 18 shown in FIG. 1 (process of "Transfer of Present Balance").

Step 74

This step carries out the same processing as that of Step 19 shown in FIG. 1 (process of "Payment").

Step 75

This step carries out the same processing as that of Step 20 shown in FIG. 1 (process of "Transfer of New Balance").

Step 76

This step carries out the same processing as that of Step 21 shown in FIG. 1 (process of "OK"). The transaction processing between the customer card 3 and the ATM card 4 is finished with this step.

Step 77

After the process of "OK", the customer card 3 transmits a signal and a balance to the ATM 2, wherein the signal indicates the finish of the receipt of the money, and the balance is renewed after the transaction processing read from the data memory 23 (processes of "Finish of Receipt of Money" and "Transfer of New Balance"). The ATM card 4 transmits a signal representing the finish of the payment to the ATM 2 (process of "Finish of Payment"). Processes from Steps 78 to 80 are the same as those from Steps 24 to 26 shown in FIG. 1 of the first embodiment.

Step 78

This step carries out the same processing as that of Step 24 shown in FIG. 1 (process of "Printing of New Balance").

Step 79

This step carries out the same processing as that of Step 25 shown in FIG. 1 (process of "Discharge of Card" and "Issue of Itemized Account").

Step 80

This step carries out the same processing as that of Step 26 shown in FIG. 1 (process of "Finish of Transaction"). The transaction processing is finished with the above processes. When the deposit is transacted, the ATM card 4 transmits the electronic money equivalent to the deposit received from the customer card 3 to the host computer 1 during the transaction processing of this electronic money. The deposit balance of the customer's account stored in the host computer 1 is renewed (increased) in accordance with the amount of the transferred electronic money. This transaction processing is finished with the above processes.

(Effect of the second Embodiment)

In addition to the effect of the first embodiment, the transaction processing system and the transaction processing method shown in the above mentioned second embodiment bring about the effects that even if the ATM card 4 is stolen, the financial institution will not be affected by any monetary damages, it is possible to save the labor of thinking out and preparing the program of the ATM card 4 in order to ensure the security, and it is possible to save the labor of setting an excessive mechanism of the ATM 2. In addition, the above system and method bring about the effect that when the ATM card 4 is replaced with others without any authentication of the host computer 1, the transaction of the ATM 2 can be discontinued.

(Modified Examples of Procedure for Transaction Processing)

Various modified examples can be regarded as transaction processing methods in the first and the second embodiments. For example, it is possible to carry out the process of "Finish of Transaction" shown in Step 26 (Steps 49 and 80) before the process of "Discharge of Card and Issue of Itemized Account". That is, this means a procedure for discharging the customer card 3 after the host computer 1 finishes settling the hypothetical payment to the customer's account.

(first Modified Example of Transaction Machine)

Various transformational cases can be considered in respect of the ATM 2 of the present invention. Described hereinafter is an explanation of the modified examples.

The ATM 2 of the present invention is designed to read out the information on transaction, particularly history of transaction processing, renewed balance, etc., from the ATM card 4, and to output the information by means of the indication part of the clerk operating section 8 or the journal printing part 13. Therefore, the ATM 2 can easily inspect the ATM card 4 and can carry out the accounting.

(Second Modified Example of Transaction Machine)

The ATM 2 of the present invention is designed so that the indication part of the clerk operating part 8 or the journal printing part 13 can be operated in accordance with conditions. For example, the comparison part (area of a part of the main control 11) of the ATM 2 is designed to make a comparison between the clerk's ID inputted from the input of the clerk operating part 8 by a clerk in charge and that stored in the memory (area of a part of the main control 11) in advance. When the two clerk's IDs agree with each other, it is possible to operate the indication part of the clerk operating part 8 or the journal printing part 13. Accordingly, the ATM 2 can prevent secrets from leaking and can prevent clerk's IDs from being used illegally by third parties. It is also possible to determine the rank of clerk's IDs. With such an arrangement, it is possible to set information which can be processed only by special clerks in charge on the basis of the rank of the clerk's IDs.

(Third Modified Example of Transaction Machine)

The ATM 2 of this invention is designed to have destruction means so that ICs are destroyed electrically by applying high voltage to them, and destruction means that connection terminals and ICs are punched and destroyed physically. With such an arrangement, when the ATM card 4 is removed compulsively from the ATM 2, it is possible to prevent the ATM card 4 from being used illegally by any third parties, because the ATM card 4 cannot be reused by the ATM 2.

(First Modified Example of Card)

Various modified examples can be considered in respect of the ATM card 4 (or the customer card 3) of the present invention. Described hereinafter is such modified examples.

The ATM card 4 (or the customer card 3) of the present invention can be designed to carry out the transaction processing of the electronic money with different monetary denominations like yen and dollar. For example, when the customer card 3 transmits a national code (monetary denomination) to the host computer 1 at the transaction processing, the foreign exchange rate is transmitted from the host computer 1 to the ATM card 4 (or the customer card 3). The ATM card 4 (or the customer card 3) is designed to carry out the transaction processing in such a manner that it stores the foreign exchange rate in the coding and decoding circuit 25, transmits the foreign exchange rate to both customer card 3 and ATM card 4, and transposes the transacted money from one to another monetary denomination. With such an arrangement, the ATM card 4 (or the customer card 3) can carry out the transaction processing of electronic money with different monetary denominations.

(Second Modified Example of Card)

The ATM card 4 (or the customer card 3) of the present invention is designed so that when the number of errors continuously occurs by the frequency determined in advance, the ATM card 4 (or the customer card 3) locks the program for transferring the electronic money by itself. This can be realized by the following mechanism, namely, for example, the ATM card 4 (or the customer card 3) stores the number of errors in the data memory 23, the CPU 20 emits a reset signal at normal time, and the CPU 20 also emits an error signal whenever an error occurs. With such an arrangement in the event of a failure, the ATM card 4 (or the customer card 3) can hold the electronic money as it is, and can prevent the electronic money from being used illegally by third parties. Also, the contents of errors are such as when an authentication for genuine ATM card (or genuine customer card 3) is not obtained, when an authentication for the transaction processing is not obtained, etc.

(Third Modified Example of Card)

The ATM card 4 of the present invention is designed to transmit a signal for information to the external equipment when an error occurs in the system. This can be realized by such a mechanism that for ATM card 4 transmits an error signal emitted from the CPU 20 from the contact 18 to the external equipment. With such an arrangement, when an error occurs in the system, the ATM card 4 can inform a clerk of the error. Also, if the signal for information has identification so that it can specify the kind of errors, the ATM card 4 can inform clerks of the contents and factors of errors.

(Fourth Modified Example of Card)

The ATM card 4 of the present invention is designed to detect the renewed balance a specific sum determined in advance and to transmit a signal for information to the external equipment. This can be realized by such a mechanism that for example, the ATM card 4 sets the renewed balance of a specific sum for detection in the data memory 23 in advance, the CPU 20 detects the renewed balance for detection set in the data memory 23, and the ATM card 4 transmits a signal for information generated when the CPU 20 detected the renewed balance from the contact 18 to the external equipment. With such an arrangement, when the balance of the stored fund is low, the ATM card 4 can require the supplement of the electronic money. Also, the renewed balance detected by the ATM card 4 can be determined arbitrarily by each financial institution within the upper limit sum determined for the system security.

(Fifth Modified Example of Card)

The ATM card 4 of the present invention can be designed to set the renewed balance for detection in the over-payment state. This can be realized by such a mechanism that for example, the ATM card 4 can be designed to set a plurality of renewed balances for detection in the data memory 23, and sets the renewed balance for the lowermost detection in the over-payment state. The ATM card 4 can be designed to transmit a signal for information which is generated each time a plurality of renewed balances for detection are detected one by one wherein these balances are set in the data memory 23 by the CPU 20 from the contact 18 to the external equipment. With such an arrangement, the ATM card 4 can transmit a signal for information to the external equipment in accordance with the renewed balance for detection, and can carry out the transaction processing until the renewed balance turns to the over-payment state determined in advance. As a result, the ATM card 4 can continue the transaction processing without any supplements of electronic money in holidays, in time zones of much transaction processing, and in time zones proximate to the closing time. Also, with regard to the supplementation of electronic money, the equivalent to the renewed balance of over-payment is supplied in the ATM card 4 which shows the renewed balance of over-payment.

(Sixth Modified Example of Card)

The ATM card 4 of the present invention can be designed to volatilize some programs. This can be realized by such a mechanism that for example, the ATM card 4 has a volatile memory and a non-volatile memory, loads programs from the external equipment, and stores the programs in the volatile memory. With such an arrangement, when the ATM card 4 is removed from the ATM 2, the ATM card 4 can prevent secrets from leaking and to prevent itself from being used illegally by third parties. Also, the program to be loaded is incomplete, because it does not function by itself. A complete program is prepared by synthesizing the above incomplete program and a program stored in the non-volatile memory of the ATM card 4 in advance.

Described hereinafter is an example of the complete program which transfers the electronic money.

The program which transfers the electronic money is divided into two wherein one is stored in the memory of the ATM 2, and the other is stored in the non-volatile memory of the ATM card 4. When the ATM 2 and the ATM card 4 are connected to each other, a program stored in the ATM 2 is loaded by the ATM card 4, and is stored in the volatile memory of the ATM card 4. A complete program will be prepared by synthesizing this program and a program stored in the non-volatile memory of the ATM card 4. This complete program is held in the ATM card 4 while the ATM card 4 is connected with the ATM 2, but when the ATM card 4 is removed from the ATM 2, the complete program will volatilize. Therefore, the ATM card 4 is designed so that when it is removed from the ATM 2, it is not able to transfer electronic money.

It is also possible to divide the program into three or more. This can be realized by the following mechanism, namely, the program is divided into three, the first program is stored in a device connected on-line with a medium such as floppy disk, etc., or the ATM 2, the second program is stored in the non-volatile memory of the ATM 2, and the third program is stored in the non-volatile memory of the ATM card 4. With such an arrangement, first the ATM 2 loads the program stored in the device connected on-line with a medium such as floppy disk, etc., or the ATM 2 and the loaded program is stored in the volatile memory of the ATM 2. When the ATM 2 and the ATM card 4 are connected with each other, this program is loaded together with a program stored in the non-volatile memory of the ATM 2 by means of the ATM card 4, and is stored in the volatile memory of the ATM card 4. A complete program is prepared by synthesizing these programs and a program stored in the non-volatile memory of the ATM card 4. Also, when the power source of the ATM 2 is turned off, the program stored in the volatile memory of the ATM 2 is volatile.

With such an arrangement, when the ATM card 4 is removed from the ATM 2, the transaction processing system can prevent secrets from leaking and to prevent the ATM card 4 from being used illegally by third parties. In addition, when the program is divided into three or more, for example, system suppliers (card suppliers and card activators) control the program stored in the non-volatile memory of the ATM 2, and card issuers control the program stored in the device connected on-line with a medium such as floppy disk, etc., or the ATM 2 and another program stored in the non-volatile memory of the ATM card 4. Therefore, the card issuers can carry out unique services while ensuring the security of the system at as high level as that of the host computer.

(First Modified Example of Transaction Processing System)

Various modified examples can be considered in the transaction processing system of the present invention. Described hereinafter are such modified examples.

The transaction processing system mentioned in the first and the second embodiments can be combined with a controller which carries out a part of the processing instead of the host computer 1.

Figure 10:
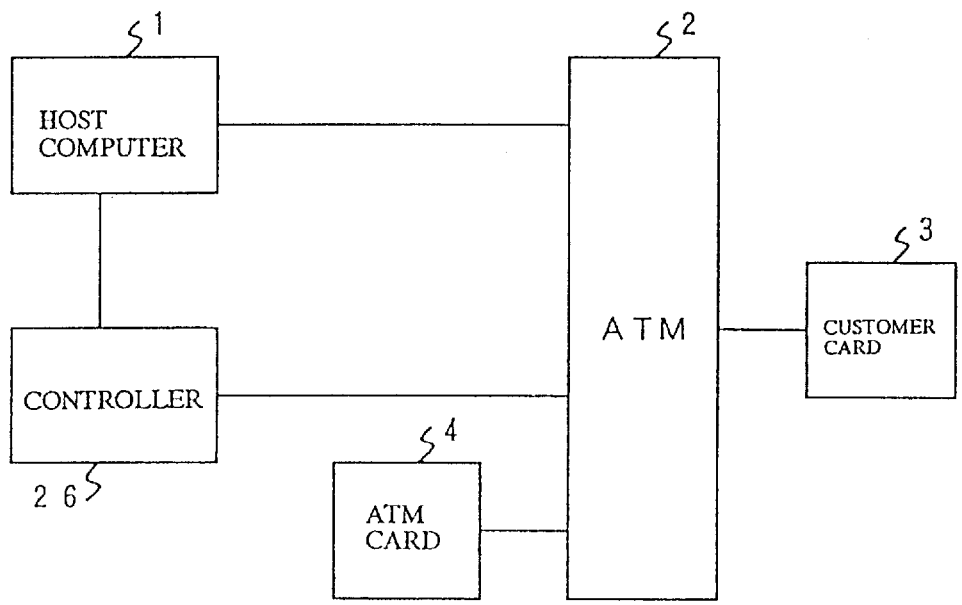
FIG. 10 shows the arrangement according to the third embodiment of the present invention.

The arrangement of the transaction processing system combined with the controller will be described hereinafter with reference to FIG. 10. FIG. 10 shows the arrangement of the transaction processing system combined with the controller.

Denoted by 26 is a controller connected on-line with the host computer 1 and the ATM 2. The controller 26 carries out a part of the processing instead of the host computer 1. For this reason, the host computer 1 can omit the processing carried out by the controller 26. Processes carried out by the controller 26 are as follows, namely, for example, authentication of the ATM card 4, granting of the ATM card ID to the ATM card 4, checking of failure of the ATM card 4, and checking of communication mode, etc. The processing efficiency can be enhanced by providing such a controller 26 at each branch (district unit), because particularly, the processings of the authentication of the ATM card 4 and the granting of the ATM card ID may be executed at each branch (district unit).

Described hereinafter are procedures for the processing carried out by the controller 26 of the present invention.

Basically, the procedures for the processing carried out by the controller 26 of the present invention are the same as those of the host computer 1. These procedures are explained while taking the authentication of the ATM card 4 and the granting of the ATM card ID to the ATM card 4 as examples.

The first explanation is the setting carried out before the authentication of the ATM card 4 and the granting of the ATM card ID to the ATM card 4.

Step 81

Before the transaction processing, the clerk in charge specifies the processing carried out by the controller 26 instead of the host computer, and the specified processing is set in the controller 26.

Step 82

When the host computer 1 and the controller 26 are connected with each other, they authenticate each other.

Step 83

When the mutual authentication is carried out between the host computer 1 and the controller 26, the host computer 1 specifies and stores the code for every controller 26, and transmits it to the controller 26. The process goes to Step 84. On the other hand, when the mutual authentication is not carried out between them, the host computer 1 transmits a signal, representing the instruction that a clerk in charge connects the host computer 1 and the controller 26 with each other on the basis of procedures determined in advance, to the external monitoring terminal, etc.

Step 84

The controller 26, upon reception of the code from the host computer 1, stores the code therein.

Step 85

The controller 26 transmits a code which is transmitted from the host computer 1 to the controller 26, and a signal to the host computer 1, wherein this signal shows the contents of processing carried out by the controller 26 instead of the host computer 1.

Step 86

The host computer 1, upon reception of these signals from the controller 26, checks to see if the controller 26 may carry out a part of the processing instead of the host computer 1. When the controller 26 can do so, the host computer 1 transmits a signal of "OK" to the controller 26. On the other hand, when the controller 26 cannot do so, the host computer 1 transmits a signal to the external monitoring terminal, etc., wherein this signal indicates a clerk in charge to change the setting of the processing carried out by the controller 26.

Step 87

The controller 26, upon reception of a signal of "OK" from the host computer 1, registers the setting of the processing carried out by itself instead of the host computer 1.

The setting carried out before the authentication of the ATM card 4 and the granting of the ATM card ID are finished with the above processes.

Described hereinafter are the authentication of the ATM card 4 and the granting of the ATM card ID.

Step 88

When the ATM 2 and the ATM card 4 are connected with each other by a clerk in charge on the basis of procedures determined in advance, they authenticate each other. That is, they carry out the same processing as that shown in Step 52.

Step 89

When the ATM 2 and the ATM card 4 finish the mutual authentication, the system code (financial institution code)

key (not shown) which is set in the input of the clerk operating section 8 of the ATM 2, in the "Inputtable" state. When the system code key is inputted by the clerk in charge, the ATM 2 reads the system code from the ATM card 4, and transmits the system code and the ATM code of the ATM 2 to the controller 26.

Step 90

The controller 26, upon reception of the system code and the ATM code from ATM 2 and the ATM card 4, and checks to see if these codes are right. When the controller 26 checks to ensure that they are right, it prepares the ATM card ID different from every ATM card 4, stores therein the ATM card ID and the ATM code while making a correspondence between them, and transmits the ATM card ID to the ATM card 4 by way of the ATM 2.

Step 91

The controller 26 also transmits the ATM card ID and the ATM code to the host computer 1.

Step 92

The ATM card 4, upon reception of the ATM card ID from the controller 26, stores it in the memory (data memory 23).

Step 93

The host computer, upon reception of the ATM card ID and the ATM code from the controller 26, stores them therein while making a correspondence between them.

The authentication of the ATM card 4 and the granting of the ATM card ID are finished with the above processes.

The ATM card ID was granted by the above processing. The ATM card 4 transmits the ATM card ID to the ATM 2 at the transaction processing. The ATM 2, upon reception of the ATM card ID from the ATM card 4, transmits both ATM code which is stored in the ATM 2, and the ATM card ID, which is received from the ATM card 4, to the host computer 1. As a result, the host computer 1, upon reception of the ATM code and the ATM card ID from the ATM 2, can make a comparison between a combination of the ATM code and the ATM card ID and that stored in the host computer 1. Therefore, the host computer 1 itself can carry out the same processing as the granting of the ATM card ID to the ATM card 4.

As mentioned above, the controller 26 of the present invention can lighten a burden of the host computer 1. Therefore, the host computer 1 can cope with many cases of the processing.

(Second Modified Example of Transaction Processing System)

It is possible to combine the transaction processing system in the first embodiment with the ATM card controller which automatically transmits an instruction for transferring the electronic money between two kinds of the ATM cards, wherein one is the ATM card where the balance has been lowered, and the other is the ATM card which is going to exceed the specific sum determined in advance, and other ATM card.

Figure 11:
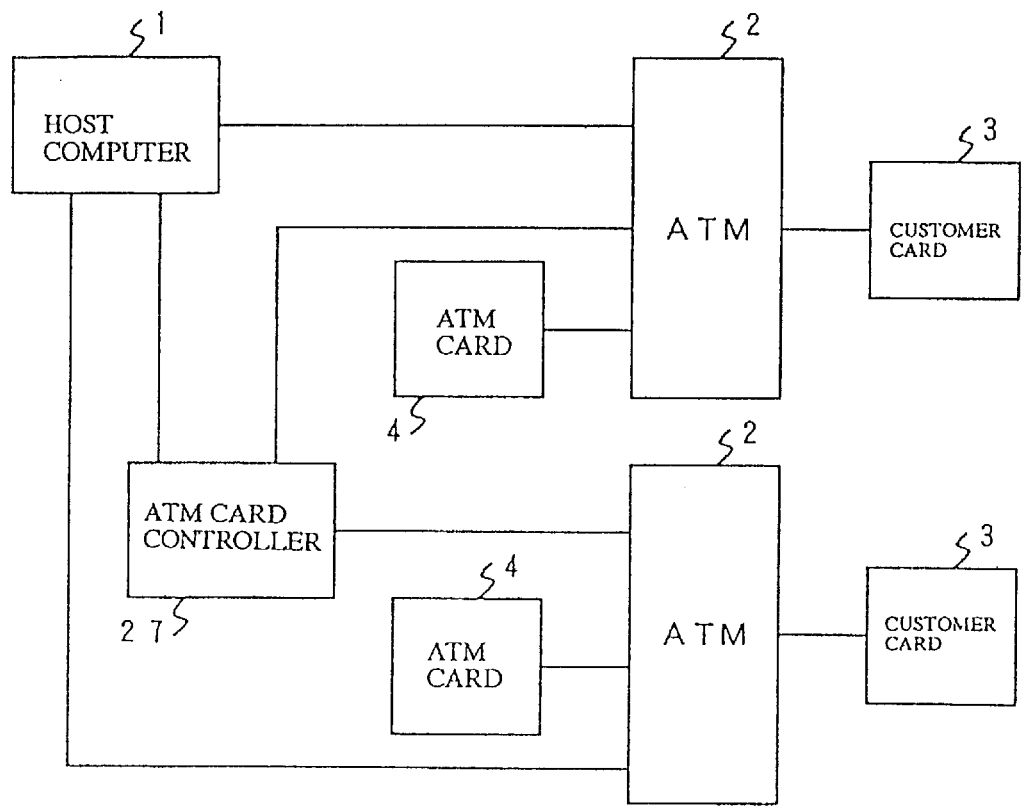
FIG. 11 shows the arrangement according to the fourth embodiment of the present invention.

The arrangement of the transaction processing system combined with the ATM card controller will be now described with reference to FIG. 11. FIG. 11 shows the arrangement of the transaction processing system combined with the ATM card controller.

Denoted by 27 is an ATM card controller connected on-line with a plurality of ATMs 2. The ATM card controller 27 receives a signal for information from the ATM card 4, and can transmit an indication to the ATM card 4, wherein this signal shows that it is necessary to supply or recover the electronic money from the ATM card 4, and this indication means the transfer of the electronic money between the ATM card 4 which transmits the signal to the ATM card controller 27 and other ATM cards 4.

Described hereinafter are procedures for processing the supply or the recovery of the electronic money.

Step 94

A plurality of balances in the vicinity of the upper and lower limits of the electronic money are stored as renewed balances for detection by card issuers in advance at each ATM card 4, respectively. Each ATM card 4 transmits a signal for information representing the requirement of the supply of the electronic money for every shortage of the balance in the vicinity of the lower limit, or another signal for information representing the requirement of the recovery of the electronic money for every excess of the balance in the vicinity of the upper limit, as different contents by stages to the ATM card controller 27.

Step 95

After the ATM card controller 27 receives the signal for information, it judges whether the signal requires the supply or recovery, and also judges a supply sum or a recovery sum. When the signal for information requires the supply, the ATM card controller 27 extracts the ATM card 4 storing much electronic money therein. The ATM card controller 27 transmits a signal representing the instruction of the transfer of the electronic money equivalent to the supply sum, to the ATM card 4 which transmitted the signal for information and the ATM card 4 extracted from the controller 27. Also, this signal includes a signal which instructs that the electronic money equivalent to the supply sum to the extracted ATM card 4, is transmitted to the ATM card 4 which transmitted the signal for information, and a signal which indicates that the electronic money is received from the extracted ATM card 4. When the signal for information requires the recovery, the ATM card controller 27 extracts the ATM card 4 storing a little electronic money therein. And the ATM card controller 27 transmits a signal, representing the instruction of the transfer of the electronic money equivalent to the recovery sum, to the ATM card 4 which transmitted the signal for information and to the extracted ATM card 4. This signal includes a signal which indicates that the electronic money, equivalent to the recovery sum to the ATM card 4 which transmitted a signal for information, is transmitted to the extracted ATM card 4, and a signal which indicates that the electronic money, which is equivalent to the recovery sum to the extracted ATM card 4, is received from the ATM card 4 which transmitted the signal for information.

Step 96

Both ATM cards 4 which received this signal transfer the electronic money on the basis of indications.

The supply or recovery of the electronic money is finished with the above processes.

The ATM card controller 27 of the present invention can automatically supply and recover the electronic money without removal of the ATM card 4 from the ATM 2. For this reason, the ATM card controller 27 has the effect that it can continuously work for long hours, particularly on holidays.

Also, the ATM card controller 27 can be designed to control the frequency of the transaction processing and the closing time. With such an arrangement, when the ATM card controller 27 receives the signal for information in time zones with much transaction processing and in almost closing time zones, it can wait without transmission of any transaction processing instructions until these time zones go or a plurality of renewed balances for detection are final, wherein these balances are determined in the ATM card 4 in advance.

Also, the ATM card controller 27 can be designed so that it can store the electronic money to save the labor of communications among ATM cards 4. With such an arrangement, the ATM card controller 27 can supply and recover the electronic money in a short time.

We claim:

1. A transaction processing system comprising a host computer of financial institutions, a transaction machine, a first card for customers, and a second card for financial institutions and stored in said transaction machine; wherein said transaction machine includes an interface for transmitting and receiving signals between said transaction machine and said host computer, a first card reader-writer for transmitting and receiving signals between said transaction machine and said first card, and a second card reader-writer for transmitting and receiving signals between said transaction machine and said second card;

said transaction machine accesses an account stored in said host computer in response to account information stored in said first card when receipt payment or payment processing is carried out;

said host computer transmits a signal representing authentication of receipt or payment processing to be carried out between said first card and said second card to said first card and said second card by way of said transaction machine;

wherein said first card and said second card directly and mutually carry out receipt or payment processing based on the signal representing authentication of the receipt or payment processing; and wherein said host computer renews a balance of said account which is accessed, by adding or subtracting a sum transferred by the receipt or payment processing.

2. A transaction system according to claim 1, wherein, when the transaction processing starts between said first card and said second card, said transaction machine relays signals which are inputted and outputted between said first card and said second card without interposition in the transaction processing until said transaction machine receives a signal representing completion of transfer of electronic money from said first card and said second card.

3. A transaction system according to claim 1, wherein electronic money is stored in advance in said second card.

4. A transaction system according to claim 1, wherein electronic money is not stored in advance in said second card, and electronic money which is transferred from said host computer or said first card to said second card is transferred to said first card or said host computer in advance.

5. A transaction system according to claim 1, wherein said computer compares a system code or an ID code set for every said second card and received from said second card, with a system code or an ID code set for every said second card stored in said computer; and wherein said second card is authenticated as a genuine second card based on a result of the comparison.

6. A transaction system according to claim 1, further comprising means for coding the electronic money based on a predetermined rule.

7. A transaction system according to claim 1, further comprising a controller for executing a part of processing instead of said host computer, wherein said controller compares a system code or an ID code set in said second card and received from said second card, with a system code or ID code set in said second card stored in said controller; and wherein said second card is authenticated as a genuine second card based on a result of the comparison.

8. A transaction system according to claim 1, further comprising a second card controller for supplying or collecting electronic money stored in said second card, wherein said second card controller transmits a signal representing an instruction of transfer of the electronic money to said second card which transmitted an information signal showing requirement of supply or collection of another electronic money which is received from said second card.

9. A transaction system according to claim 1, wherein said transaction machine includes a printer for printing on a thermoplastic indication part formed on a surface of said first card or said second card.

10. A transaction system according to claim 1, wherein said transaction machine includes a display indicator or a journal printer, and wherein said transaction machine reads information representing a history of transaction processing or a renewed balance from said second card, and indicates or prints the read information on a display or a journal.

11. A transaction system according to claim 1, wherein said transaction machine includes a clerk operation part, and wherein said transaction machine, compares an ID code inputted from said clerk operation part with a clerk ID code stored in said transaction machine, and wherein said transaction machine indicates on a display or prints on a journal when both ID codes agree with each other.

12. A transaction system according to claim 1, wherein said transaction machine includes a customer operation part, and wherein said transaction machine indicates whether electronic money is added to said first card or not after cash is received through said customer operation part.

13. A transaction system according to claim 1, wherein said transaction machine includes a customer operation part, and wherein said transaction machine indicates whether electronic money is added to said first card or cash is paid to a customer when payment is carried out by said customer operation part.

14. A transaction system according to claim 1, wherein said transaction machine can pay in cash, an amount specified by a customer within an allowable range of said second card.

15. A transaction system according to claim 1, wherein said transaction machine can deposit an amount specified by a customer in an applicable account stored in said host computer within an allowable range of said first card.

16. A transaction system according to claim 1, wherein said transaction machine includes destruction means for electrically or physically destroying said second card, and wherein said second card, is destroyed so as not to be reused when said second card is forcibly removed from said transaction machine.

17. A transaction system according to claim 1, wherein said transaction machine includes, a volatile memory, and a CPU for storing therein a program for loading a part of a program from an external equipment and carrying out processing, wherein the part of the program is loaded from said external equipment and is stored in said volatile memory when said transaction machine is connected to said external equipment, and wherein the program loaded from said external equipment is volatile when a power source of said transaction machine is cut off.

18. A transaction system according to claim 1, wherein said second card locks a program for transferring electronic money when a predetermined continuous number of errors occur.

19. A transaction system according to claim 18, wherein said second card transmits an information signal to an external equipment when locking the program for transferring the electronic money.

20. A transaction system according to claim 1, wherein said second card transmits an information signal to an external equipment when detecting a given amount of renewed balance predetermined in advance.

21. A transaction system according to claim 1, wherein said second card can carry out the transaction processing until a renewed balance reaches a given amount of overpayment predetermined in advance.

22. A transaction system according to claim 1, wherein said second card includes, a volatile memory, and a CPU for storing therein a program for loading a part of a program from said transaction machine and carrying out processing, wherein a part of said program for transferring the electronic money is loaded from said transaction machine and is stored in said volatile memory when said second card is connected to said transaction machine, and wherein the part of the program for transferring the electronic money is volatile when said second card is removed from said transaction machine.

23. A transaction system according to claim 1, wherein each of said first card and said second card include respectively;

a memory; and an indication part;

wherein said first card and second card respectively store information representing histories of transaction processing thereof and renewed balances thereof in said memory, and indicate information representing histories of update transaction processing and renewed balances on said indication part when they respectively receive a signal showing completion of transfer of electronic money.

24. A transaction system according to claim 1, wherein each of said first card and said second card include respectively;

a memory;

an indication part using a display; and input means;

wherein said first card and second card respectively store information representing histories of transaction processing thereof and renewed balances thereof in said memory when they respectively receive a signal showing completion of transfer of electronic money, and selectively indicate information representing histories of transaction processing or renewed balances thereof on said indication part based on an instruction inputted from said input means and representing that a content of indication of said indication part is switched.

25. A transaction system according to claim 1, wherein each of said first card and said second card include respectively;

a data memory;

an indication part using a display; and input means;

wherein said first card and second card compare a personal ID code stored in said data memory and a personal ID code inputted from said input means;

wherein said first card and second card respectively can indicate information of histories of transaction processing and renewed balances thereof on said indication part only when both ID codes agree with each other.

26. A transaction processing method for a transaction processing system comprising a host computer of financial institutions, a transaction machine, a first card for customers, and a second card for financial institutions and stored in said transaction machine; said transaction processing method comprising:

said transaction machine checking a genuineness of said first card;

said transaction machine accessing an account stored in said host computer in response to an account information stored in said first card;

said transaction machine checking to see whether a card holder is a corresponding customer in person;

said host computer authenticating a receipt or payment processing to be carried out between said first card and said second card and transmitting a signal representing authentication of the transaction processing to said first card and said second card, and wherein said first card and said second card mutually authenticate each other based on the signal representing authentication of the receipt or payment processing received from said host computer, then directly and mutually transfer electronic money, and wherein said host computer renews a balance of said account which is accessed, by adding or subtracting a sum transferred by the receipt or payment processing.

27. A transaction processing method according to claim 26, further comprising said transaction machine relaying signals inputted and outputted between said first card and said second card without interposition in the transaction processing until said transaction machine receives a signal showing completion of transfer of the electronic money from said first card and second card when the transaction processing starts between said first card and said second card.

28. A transaction processing method according to claim 26, wherein the electronic money is stored in said second card in advance.

29. A transaction processing method according to claim 26, wherein the electronic money is not stored in said second card in advance, and the electronic money which is transferred from said host computer or said first card to said second card is transferred to said first card or said host computer in advance.

* * * * *